(12) United States Patent
Jackson et al.

(10) Patent No.: US 8,606,792 B1
(45) Date of Patent: Dec. 10, 2013

(54) SCORING AUTHORS OF POSTS

(75) Inventors: Todd Jackson, San Francisco, CA (US);
Andrew A. Bunner, Belmont, CA (US);
Matthew S. Steiner, Mountain View, CA (US); John Pongsajapan, San Francisco, CA (US); Annie Tsung-I Chen, Rueschlikon (CH); Keith J. Coleman, Mountain View, CA (US); Edward S. Ho, Palo Alto, CA (US); Sean E. McBride, San Francisco, CA (US); Jessica Shih-Lan Cheng, Mountain View, CA (US)

(73) Assignee: Google Inc., Mountain View, CA (US)

( * ) Notice: Subject to any disclaimer, the term of this patent is extended or adjusted under 35 U.S.C. 154(b) by 240 days.

(21) Appl. No.: 12/756,072

(22) Filed: Apr. 7, 2010

Related U.S. Application Data

(60) Provisional application No. 61/302,534, filed on Feb. 8, 2010.

(51) Int. Cl.
*G06F 17/30* (2006.01)

(52) U.S. Cl.
USPC ........................................................ 707/748

(58) Field of Classification Search
USPC ........................................................ 707/748
See application file for complete search history.

(56) References Cited

U.S. PATENT DOCUMENTS

| | | | |
|---|---|---|---|
| 5,371,673 A | 12/1994 | Fan | |
| 5,557,518 A | 9/1996 | Rosen | |
| 5,559,895 A | 9/1996 | Lee et al. | |
| 5,561,282 A | 10/1996 | Price et al. | |
| 5,659,616 A | 8/1997 | Sudia | |
| 5,825,880 A | 10/1998 | Sudia | |
| 5,867,578 A | 2/1999 | Brickell et al. | |
| 5,892,824 A | 4/1999 | Beatson et al. | |

(Continued)

FOREIGN PATENT DOCUMENTS

| | | |
|---|---|---|
| EP | 1 363 208 | 11/2003 |
| WO | WO00/62220 | 10/2000 |

OTHER PUBLICATIONS

'Reading gets personal with popular items and personalized ranking' [online]. The Official Google Blog, Oct. 22, 2009, [retrieved on Jan. 27, 2010]. Retrieved from the Internet: http://googleblog.blogspot.com/2009/10/reading-gets-personal-with-popular-items-and-personalized-ranking.

(Continued)

*Primary Examiner* — Wilson Lee
*Assistant Examiner* — Thuy Bui
(74) *Attorney, Agent, or Firm* — Fish & Richardson P.C.

(57) ABSTRACT

In general, the subject matter described in this specification can be embodied in methods, systems, and program products. A score for each of a plurality of authors of posts submitted to a server system is determined. The score for each individual author in the plurality is based on a score of one or more authors in the plurality that have requested to subscribe to a stream of posts that the individual author submits to the server system. A particular post submitted by a particular author in the plurality is received at the server system and from a computing device. A score is assigned to the particular post based on a score of the particular author. The particular post is transmitted from the server system to computing devices that are associated with authors who have requested to subscribe to posts by the particular author.

33 Claims, 13 Drawing Sheets

(56) References Cited

U.S. PATENT DOCUMENTS

| | | | |
|---|---|---|---|
| 5,983,268 A | 11/1999 | Freivald et al. |
| 6,064,751 A | 5/2000 | Smithies et al. |
| 6,079,018 A | 6/2000 | Hardy et al. |
| 6,115,699 A | 9/2000 | Hardjono |
| 6,167,518 A | 12/2000 | Padgett et al. |
| 6,260,064 B1 | 7/2001 | Kurzrok |
| 6,282,552 B1 | 8/2001 | Thompson et al. |
| 6,285,999 B1 | 9/2001 | Page |
| 6,334,131 B2 | 12/2001 | Chakrabarti et al. |
| 6,356,924 B2 | 3/2002 | Mullen-Schultz |
| 6,378,075 B1 | 4/2002 | Goldstein et al. |
| 6,381,344 B1 | 4/2002 | Smithies et al. |
| 6,629,081 B1 | 9/2003 | Cornelius et al. |
| 6,742,030 B1 | 5/2004 | MacPhail |
| 6,760,752 B1 | 7/2004 | Liu et al. |
| 6,871,191 B1 | 3/2005 | Kinney, Jr. et al. |
| 7,013,323 B1 | 3/2006 | Thomas et al. |
| 7,047,241 B1 | 5/2006 | Erickson |
| 7,069,308 B2 | 6/2006 | Abrams |
| 7,185,065 B1 | 2/2007 | Holtzman et al. |
| 7,370,036 B2 | 5/2008 | Vedula |
| 7,406,599 B1 | 7/2008 | Pravetz et al. |
| 7,565,358 B2 | 7/2009 | Minogue et al. |
| 7,593,740 B2 | 9/2009 | Crowley et al. |
| 7,610,233 B1 | 10/2009 | Leong et al. |
| 7,765,396 B2 | 7/2010 | Haufe |
| 7,818,392 B1 | 10/2010 | Martino et al. |
| 8,224,826 B2 | 7/2012 | Minogue et al. |
| 8,239,917 B2 | 8/2012 | Hammond, II et al. |
| 8,296,293 B2 | 10/2012 | Minogue et al. |
| 2001/0002485 A1 | 5/2001 | Bisbee |
| 2001/0018731 A1 | 8/2001 | Fujii et al. |
| 2002/0052928 A1 | 5/2002 | Stern et al. |
| 2002/0062368 A1 | 5/2002 | Holtzman et al. |
| 2002/0073125 A1 | 6/2002 | Bier |
| 2002/0124172 A1 | 9/2002 | Manahan |
| 2002/0143755 A1 | 10/2002 | Wynblatt et al. |
| 2002/0169865 A1 | 11/2002 | Tarnoff |
| 2002/0184333 A1 | 12/2002 | Appelman |
| 2003/0009461 A1 | 1/2003 | Notargiacomo et al. |
| 2003/0046366 A1 | 3/2003 | Pardikar et al. |
| 2003/0050919 A1 | 3/2003 | Brown et al. |
| 2003/0051142 A1 | 3/2003 | Hidalgo et al. |
| 2003/0070072 A1 | 4/2003 | Nassiri |
| 2003/0115151 A1 | 6/2003 | Wheeler et al. |
| 2003/0126245 A1 | 7/2003 | Feltin et al. |
| 2003/0163597 A1 | 8/2003 | Hellman et al. |
| 2003/0172120 A1 | 9/2003 | Tomkow et al. |
| 2003/0182421 A1 | 9/2003 | Faybishenko et al. |
| 2003/0212862 A1 | 11/2003 | James |
| 2003/0217264 A1 | 11/2003 | Martin et al. |
| 2003/0233345 A1 | 12/2003 | Perisic et al. |
| 2004/0019546 A1 | 1/2004 | Ta et al. |
| 2004/0041707 A1 | 3/2004 | Hull et al. |
| 2004/0078750 A1 | 4/2004 | Frank |
| 2004/0181756 A1 | 9/2004 | Berringer et al. |
| 2004/0205076 A1 | 10/2004 | Huang et al. |
| 2004/0205513 A1 | 10/2004 | Chen et al. |
| 2004/0255115 A1 | 12/2004 | DeMello et al. |
| 2005/0033747 A1 | 2/2005 | Wittkotter |
| 2005/0044197 A1 | 2/2005 | Lai |
| 2005/0050066 A1 | 3/2005 | Hughes |
| 2005/0060312 A1 | 3/2005 | Curtiss et al. |
| 2005/0065924 A1 | 3/2005 | Silverbrook et al. |
| 2005/0086260 A1 | 4/2005 | Canright et al. |
| 2005/0160363 A1 | 7/2005 | Bhogal et al. |
| 2005/0177389 A1 | 8/2005 | Rakowicz et al. |
| 2005/0192958 A1 | 9/2005 | Widjojo et al. |
| 2005/0210114 A1 | 9/2005 | Washburn |
| 2005/0223002 A1 | 10/2005 | Agarwal et al. |
| 2005/0251683 A1 | 11/2005 | Levy et al. |
| 2005/0256866 A1 | 11/2005 | Lu et al. |
| 2006/0004628 A1 | 1/2006 | Axe et al. |
| 2006/0015488 A1 | 1/2006 | Perisic et al. |
| 2006/0020596 A1 | 1/2006 | Liu et al. |
| 2006/0026123 A1 | 2/2006 | Moore et al. |
| 2006/0026140 A1 | 2/2006 | King et al. |
| 2006/0031235 A1 | 2/2006 | Foresti et al. |
| 2006/0036599 A1 | 2/2006 | Glaser et al. |
| 2006/0041516 A1 | 2/2006 | Bogasky et al. |
| 2006/0047963 A1 | 3/2006 | Brown et al. |
| 2006/0101269 A1 | 5/2006 | Moskowitz et al. |
| 2006/0112105 A1 | 5/2006 | Adamic et al. |
| 2006/0112165 A9 | 5/2006 | Tomkow et al. |
| 2006/0167784 A1 | 7/2006 | Hoffberg |
| 2006/0168057 A1 | 7/2006 | Warren et al. |
| 2006/0173867 A1 | 8/2006 | Gaucas et al. |
| 2006/0179320 A1 | 8/2006 | Berringer et al. |
| 2006/0184452 A1 | 8/2006 | Barnes et al. |
| 2006/0212707 A1 | 9/2006 | Cahill et al. |
| 2006/0235810 A1 | 10/2006 | Wen et al. |
| 2006/0242026 A1 | 10/2006 | Crespo et al. |
| 2006/0248076 A1 | 11/2006 | Troy et al. |
| 2006/0253458 A1 | 11/2006 | Dixon et al. |
| 2006/0294086 A1 | 12/2006 | Rose et al. |
| 2006/0294134 A1 | 12/2006 | Berkhim et al. |
| 2007/0027819 A1 | 2/2007 | Cowburn et al. |
| 2007/0028107 A1 | 2/2007 | Cowburn et al. |
| 2007/0078936 A1 | 4/2007 | Quinlan et al. |
| 2007/0112761 A1 | 5/2007 | Xu et al. |
| 2007/0124432 A1 | 5/2007 | Holtzman et al. |
| 2007/0174247 A1 | 7/2007 | Xu et al. |
| 2007/0174471 A1 | 7/2007 | Van Rossum |
| 2007/0214096 A1 | 9/2007 | Newman et al. |
| 2008/0005064 A1 | 1/2008 | Sarukkai |
| 2008/0052633 A1 | 2/2008 | Kubo et al. |
| 2008/0114709 A1 | 5/2008 | Dixon et al. |
| 2008/0222551 A1 | 9/2008 | Takamune |
| 2008/0307488 A1 | 12/2008 | Hammond et al. |
| 2009/0006371 A1 | 1/2009 | Denoue et al. |
| 2009/0100508 A1 | 4/2009 | Labaton |
| 2009/0106697 A1* | 4/2009 | Ward et al. ............... 707/5 |
| 2009/0222551 A1 | 9/2009 | Neely et al. |
| 2010/0070510 A1 | 3/2010 | Agarwal et al. |
| 2010/0153404 A1* | 6/2010 | Ghosh et al. ............ 707/748 |
| 2010/0241595 A1 | 9/2010 | Felsher |
| 2010/0241964 A1* | 9/2010 | Belinsky et al. ............ 715/738 |
| 2010/0263057 A1 | 10/2010 | Nguyen et al. |
| 2011/0022602 A1* | 1/2011 | Luo et al. ............ 707/748 |
| 2011/0099507 A1* | 4/2011 | Nesladek et al. ............ 715/780 |
| 2011/0140857 A1 | 6/2011 | Hull et al. |
| 2011/0154223 A1* | 6/2011 | Whitnah et al. ............ 715/753 |
| 2011/0173316 A1* | 7/2011 | Moromisato et al. ......... 715/753 |
| 2011/0212430 A1* | 9/2011 | Smithmier et al. .......... 434/322 |
| 2011/0289005 A1 | 11/2011 | Walker et al. |
| 2011/0289095 A1 | 11/2011 | Minogue et al. |
| 2012/0036127 A1 | 2/2012 | Work et al. |
| 2012/0197804 A1 | 8/2012 | Hind et al. |

OTHER PUBLICATIONS

'Twitter' [online], Wikipedia, Jan. 27, 2010, [retrieved on Jan. 27, 2010]. Retrieved from the Internet: http://en.wikipedia.org/wiki/twitter.
'Gmail' [online], Wikipedia, Mar. 20, 2010, [retrieved on Mar. 22, 2010]. Retrieved from the Internet: http://en.wikipedia.org/w/index.php?title=gmail&oldid=350982667.
'Facebook rolls out revamped news feed' [online], The Christian Science Monitor, Oct. 23, 2009, [retrieved on Jan. 27, 2010]. Retrieved from the Internet: http://www.csmonitor.com/layout/set/print/content/view/print/261662.
ISR/WO PCT/US2006/030754, mailed Nov. 17, 2006, 15 pages.
IPRP PCT/US2006/030754, mailed Feb. 21, 2008, 7 pages.
'XML-Signature Syntax and Processing', [online]. Bartel et al., 2002 [retrieved on May 24, 2006]. Retrieved from the Internet: <URL: www.w3.org/TR/xmldsig-core/>, 60 pages.
"DiSigncryption: An Integration of Agent-based Signature Delegation with Distributed Reputation Management Scheme"—P. Bamasak, N. Zhang and D. Edwards—IEEE 32005, pp. 1-8.
"How to Make Secure Email Easier to Use"—Garfinkel, David Margrave, Jeffrey I. Schiller, Erik Nordlander and Robert C. Miller—CHI ACM Apr. 2-7, 2005, pp. 1-11.

(56) References Cited

OTHER PUBLICATIONS

"Target dependent score normalization techniques and their application to signature verification" J. Fierrez-Aguilar, J. Orgega Garcia-Rodriguez—Systems, Many and Cybernetics, IEEE—Aug. 2005, pp. 418-425.

Bertino et al.—"Receipt Management Transaction History Based Trust Establishment" Cerias.purdue.edu 2002—ACM (pp. 1-13).

Kathleen M Griffiths, and Helen Christensen—"Website Quality Indicators for Consumers"—J Med Internet Res. Oct.-Dec. 2005; (5): e55. Published online Nov. 15, 2005. doi: 10.2196/jmir.7.5.e55, Reviewed by Holly Witteman and Sasha Shepperd, PMCID: PMC1550688: http://www.ncbi.nlm.nth.gov/pmc/articles/PMC1550688/ 5 pages.

Kramer et al. "Analysis of Peer-to-Peer Network Security Using Gutella"—Department of Computer Science, cs. berkeley.edu, 2002 (pp. 1-20).

Liangzhao Zeng, Boualem Benatallah, Anne H.H. Ngu, Marlon Dumas, Jayant Kalagnanam, and Henry Chang—"OoS-Aware Middleware for Web Services Composition"—IEEE Transactions on Software Engineering, vol. 30, No. 5, May 2004—(pp. 311-327).

Lioy, et al. "Multiple Electronic Signatures on Multiple Documents" *Proceedings of the 1st* International Workshop on electronics Government and Commerce: Design, Modeling, Analysis and Security, EGCDMAS 2004, 12 pages.

Yufeng, W., and Nakao, A., "Poisonedwater: An Improved Approach for Accurate Reputation Ranking in P2P Networks," Future Generation Computer Systems 26(2010) 1317-1326.

Ziegler, Cai-Nicholas, "Chapter 6: On Propogating Interpersonal Trust in Social Networks," Computing with Social Trust, Human-Computer Interaction Series, J. Golbeck, ed., Springer-Verlag, London, 2009, pp. 133-168.

Ziegler, C.-N., Lausen, G., "Propogation Models for Trust and Distrust in Social Networks," Information Systems Frontiers, 7:4/5, 337-358, 2005.

\* cited by examiner

| User | A1 | S1 | A2 | S2 | A3 | S3 | A4 | S4 |
|---|---|---|---|---|---|---|---|---|
| Frank | Pizza Store | 4 | Mary | 89 | Lindsey | 33 | Thomas | 10 |
| Lindsey | Frank | 33 | Susan | 33 | Thomas | 71 | --- | --- |
| Thomas | Frank | 10 | Lindsey | 71 | Susan | 328 | --- | --- |
| Susan | Mary | 27 | Bill | 59 | Thomas | 328 | Lindsey | 94 |
| Mary | Susan | 27 | Frank | 89 | --- | --- | --- | --- |
| Bill | John | 41 | Susan | 59 | --- | --- | --- | --- |
| John | Pizza Store | 66 | Doug | 15 | Bill | 41 | Frank | 132 |
| Doug | John | 15 | --- | --- | --- | --- | --- | --- |
| Pizza Store | John | 66 | Frank | 4 | --- | --- | --- | --- |

SCORING AUTHORS OF POSTS

CROSS-REFERENCE TO RELATED APPLICATIONS

This application claims the benefit of U.S. Provisional Application Ser. No. 61/302,534, filed Feb. 8, 2010. The disclosure of the prior application is considered part of (and is incorporated by reference in) the disclosure of this application.

TECHNICAL FIELD

This document generally describes techniques, methods, systems, and mechanisms for recommending posts in a messaging service to users that do not subscribe to an author of the post, and for scoring authors of posts.

BACKGROUND

The present disclosure generally relates to messaging systems. A user of a computing device (e.g., an application telephone or a desktop computer) may use the device to post textual and multimedia posts (e.g., messages) with a microblogging application, so that other people that use a microblogging service and that "follow" or "subscribe" to the user can receive the post. The post can be transmitted by the computing device to a server system that hosts the microblogging service. The server system may disseminate the post to the users that have subscribed to the author of the post.

SUMMARY

This document generally describes recommending posts to non-subscribing users of a messaging service, and scoring authors of posts. A messaging system can enable users of the messaging system to subscribe to other users so that when the other users submit posts (e.g., textual or multimedia messages), the posts are routed by a server system to the subscribing users. Each subscribing user may view a stream of posts, where the stream includes (i) posts from any subscribed authors, and (ii) posts that are recommended by the messaging system for the subscribing user (even though the user has not subscribed to the post's authors).

The recommended posts can include a short note or icon that identifies the post as a non-subscribed post, and also may include a reason that the post was recommended. The post may also include an option that enables a user to revise recommendation settings associated with the reason for recommendation.

A post can be recommended based on a score of the post. Example signals used in scoring a post can include a reputation of the post's author, substantive post content, a geographic location of the post's author at a time of posting, a number of comments on the post and a content of the comments, and a number of user-supplied indications of favorable user opinion of the post (e.g., a number of user selections of a "like" interface element). The score of the post can be computed upon its posting and recomputed with every comment and like.

A relationship, in a social network graph, between an author of the post and a user of the messaging system can be used to determine if the post should be recommended to the user. The social network graph can be a data structure that identifies relationships between users of the messaging service and a strength of the relationships. A relationship can be created when: (i) a user agrees to follow another user, (ii) a user comments on another user's post, (iii) users of the messaging service are identified in another data set that is stored for the user (e.g., an address book for the user that the messaging service can access, or that the user provides to the messaging service), (iv) the users are both identified as depicted in a photograph, (v) the users are identified as being geographically near each other at a particular time (e.g., mobile telephones of each user are located together at multiple different times), (vi) the users email or chat with each other frequently, and (vi) the users interact on third party websites. A distance between two users can be determined based on a number of individuals that are necessary to connect the two users, and a strength of each relationship in a chain of the connecting relationships.

The distance between the two users can be used to weight the score of the post. The distance can also be used to weight individual signals that are used in generating the score (e.g., weighting a "number of following users" signal based on how related the following users are in relation to the user). The distance can also be used to calculate thresholds that are necessary to recommend the post. For example, the more distant two users, the lower a score of a post by one of the users and/or a higher a threshold level at which post scores by one of the users must surpass in order to be provided in the other user's stream.

A post's score can be based off of a reputational score of the post's author. The reputational score can be calculated based on several criteria, for example, a number of users that follow the author and a quantity and quality of comments that the author receives on his posts. The reputational score can also be based on a similarly computed reputational score of each user that follows the author. In other words, if authors with high reputational scores agree to subscribe to posts by a particular author, the particular author's reputational score can be higher than if the following authors were not highly ranked.

Thus, an author that attempts to maliciously generate high scoring posts (e.g., so that the posts will be provided to users that do not follow the malicious author), may have limited success increasing his score because authors with high reputational scores may not be willing to subscribe to the malicious author and receive posts that are generated by the malicious author. The malicious author may be able to set up dummy accounts that provide favorable feedback on the malicious author's posts and comment frequently on the malicious author's posts, but the dummy accounts are not likely to have high reputational scores. Thus, scoring posts based on an author's reputation can be a particularly beneficial manner to prevent the messaging system from recommending posts from malicious users.

In general, one aspect of the subject matter described in this specification can be embodied in methods, systems and program products. A server system receives from a plurality of computing devices indications that a user of each of the computing devices provided user input requesting to receive transmissions of posts that a first user authors. The server system receives from a first computing device a post that includes text and that was authored by the first user of the first computing device. The post is transmitted from the server system to the plurality of computing devices. A score for the post is determined to satisfy a criteria for transmission to a second user who has not requested to receive posts authored by the first user. The determination uses a distance of the second user to the first user in a social network graph. In response to determining that the post score satisfies criteria for transmission to the second user, the post is transmitted from the server system to a second computing device that is associated with the second user.

Another aspect of the subject matter described in this specification can be embodied in a method. A server system receives from a plurality of computing devices, indications that a user of each of the plurality of computing devices requested to subscribe to posts that are authored by a first user. The server system receives from a first computing device, a post that was authored by the first user. The post is transmitted from the server system to the plurality of computing devices. A personalized score that is for the post and is specific to a second user that has not requested to receive posts that are authored by the first user is generated, the generation of the personalized score based on distances in a social network graph between the second user and other users of the social network that have interacted with the post that was authored by the first user. The personalized score is determined to exceed a threshold. In response to the determining, the post is transmitted from the server system to a second computing device that is associated with the second user.

In yet another aspect, the subject matter described in this specification can be embodied in a computer-implemented method. User input is received at a first computing device that identifies multiple authors to which a first user is subscribing. Indications of the multiple authors to which the first user is subscribing are transmitted from the first computing device to a server system. A plurality of posts are received at the first computing device and from the server system. The plurality includes (i) subscribed posts that are created by authors that the first user has subscribed, and (ii) recommended posts that the server system determined satisfy criteria for transmission to the first user. The determination uses a distance of the first user to one or more other users in a social network graph. The plurality of posts are presented as an integral stream of posts on a display of the first computing device.

In yet another aspect, the subject matter described in this specification can be embodied in a system. The system includes a posting computerized device. A posting user transmitted a post from the posting computerized device to a server system. The system includes a first plurality of computerized devices. A first plurality of users that have logged into the first plurality of computerized device have requested to receive posts authored by the posting user. The system includes a second plurality of computerized devices. A second plurality of users that have logged into the second plurality of computers have not requested to receive posts authored by the posting user. The system includes a means to identify the second plurality as computerized devices to receive the post. The second plurality are identified as computerized devices that satisfy a criteria for receiving the post based on a score of the post and a distance of the second users to the posting user in a social network graph. The system includes a re-transmission mechanism at the server system to receive the post from the posting computerized device and to transmit the post to the first plurality of computers and to the second plurality of computers.

These and other implementations can optionally include one or more of the following features. The server system may not provide to the second user posts that (i) are authored by the first user, and (ii) that are associated with scores that do not meet the criteria. In response to receiving the requests, the server system may transmit to the plurality of computing devices, all posts that the first user subsequently authors. The post may not identify, as intended recipients of the post, the plurality of computing devices or the users of the plurality of computing devices. The determination may use the distance of the second user to the first user in the social network to modify the criteria. The determination may use the distance of the second user to the first user in the social network to modify the score. The score for the post may be generated by determining a quantity of comments that users have submitted in association with the post and comparing the quantity of comments to a historical quantity of comments that posts authored by the first user have received. The social network graph may be a data structure that identifies, for a plurality of users that can transmit and receive posts, an acquaintance relationship of the users in the plurality to each other. The social network graph may identify, for each acquaintance relationship, a strength of the acquaintance relationship. The distance may be based on (i) a minimum number of acquaintance relationships to connect the first user and the second user, and (ii) a strength of the connecting relationships. The first post may include an identification of a posting location. The posting location may be determined to be within a threshold distance of a location of the second computing device. Transmitting the post to the second computing device may be dependent upon determining that the criteria is met and determining that the posting location is within the threshold distance. A collection of words that are common between instances of content that the second user has generated or viewed may be determined. Determining the collection of words may include not including in the collection words that are included in a pre-determined set of words that includes words that are frequently used in a particular language. A determination may be made that the post includes one or more words from the collection. Transmitting the post to the second computing device may be dependent upon determining that the post includes the one or more words from the collection. Determining the collection of words may include identifying, as a word to include in the collection, a word from a query that the second user submitted to a search engine. Determining the collection of words may include identifying, as a word to include in the collection, a word within a selected search engine result document. The selected search engine result document may be a document that the user selected to view in response to being presented with a list of search results that are responsive to a search query that the user submitted. Generating the personalized score may be based on distances in the social network graph between the second user and users of the social network that commented on the post that was authored by the first user. The first user may not have subscribed to authors of the recommended posts. The integral stream of posts may include every post of each author to which the first user has subscribed. The recommended posts may be authored by authors to which the first user has not subscribed.

In general, one aspect of the subject matter described in this specification can be embodied in methods, systems and program products. A score for each of a plurality of authors of posts submitted to a server system is determined. The score for each individual author in the plurality is based on a score of one or more authors in the plurality that have requested to subscribe to a stream of posts that the individual author submits to the server system. A particular post submitted by a particular author in the plurality is received at the server system and from a computing device. A score is assigned to the particular post based on a score of the particular author. The particular post is transmitted from the server system to computing devices that are associated with authors who have requested to subscribe to posts by the particular author.

Another aspect of the subject matter described in this specification can be embodied in a system. The system includes a computer-readable repository that stores scores for each of a plurality of authors of posts. The system includes a transmission mechanism to receive a submission of a post from a particular author and to broadcast the post to authors who subscribe to posts submitted by the particular author. The system includes a means to determine a score for each individual author of the plurality of authors based on a score of one or more authors who subscribe to a stream of posts by the individual author.

In yet another aspect, the subject matter described in this specification can be embodied in a method. Data representing a plurality of authors is obtained at a server system. At least some of the authors are followed authors and at least some of the authors are following authors. At least some of the authors are both followed and following authors. Each of the following authors is subscribed to one or more of the followed authors so as to receive posts that are submitted by the one or more followed authors. A score for each followed author is generated at the server system based on scores of following authors who are subscribed to the followed author. A particular post submitted by a particular author from the plurality is received at the server system. A determining that the score of the post meets a criteria for submission to recommended authors who do not subscribe to the particular author is made. The post is transmitted from the server system to: (i) computing devices associated with authors who subscribe to the particular author, and (ii) computing devices associated with the recommended authors.

These and other implementations can optionally include one or more of the following features. The score for each individual author may be further based on a quantity of authors in the plurality who have requested to subscribe to the stream of posts that the individual author submits to the server system. The score for each individual author may be further based on a quantity of comments that are received as replies to posts that the individual author submits to the server system. Each comment may be submitted by a recipient of a distinct post to the server system for dissemination to other recipients of the distinct post. The score for each individual author may be further based on a quality of the comments. A quality of each comment may be determined based on a substantive nature of text in the comment. The score for each individual author may further be based on a quantity of selections, by other authors, of an interface element that accompanies a display of posts by the individual author and as viewed by the other authors. Selection of the interface element indicates a favorable opinion of the post. At least one individual author has requested to subscribe to authors who are connected in a chain of subscribing authors back to the at least one individual author. A score for the particular post that satisfies a criteria for transmission to a recipient author that has not requested to subscribe to a stream of posts submitted by the particular author is determined. The determining may use a distance of the particular author to the recipient author in a social network graph. The particular post and other posts that are to be provided to an author may be ranked based on scores of the posts. The particular post and the other posts from the server system may be received. The particular post and the other posts may be displayed on a display of a computing device in a ranked order. Determining the score for each individual author of the plurality of authors may include weighting an impact of the score of the one or more authors based on a level of interaction of each of the one or more authors with the individual author.

The system may include a ranking unit to determine, for the particular author, a ranking of posts submitted by authors to whom the particular author subscribes, the ranking based on scores for the authors. The system may include an author scoring unit to determine a score for each of the plurality of authors based on a quantity of comments that each individual author receives on posts by the individual author. The comments may be text postings that are submitted (i) by other authors who receive posts by the individual author, and (ii) as a responsive communications to the posts. The comments for each individual post may be provided to a server system for dissemination to all authors who received the individual post. The system may include a plurality of computing devices that are each associated with an author of posts. Each computing device may include a display. Each display may present a ranked list of posts that are each associated with an author. Each list may be ranked based on scores of the associated authors.

A following author may subscribe to a followed author by providing user input that identifies that the following author would like to receive each and every post submitted by the followed author to the server system as part of a microblogging service. The score for each followed author may be further based on a quantity of comments that are submitted to the server system in association with posts that the followed offer submits to the server system. Generating the score for each followed author may weight an impact of scores of the following authors to the followed author based on a number of times that each of the following authors commented on posts that the followed author submitted.

Particular embodiments can be implemented, in certain instances, to realize one or more of the following advantages. Messaging services may recommend posts that are targeted to specific users of the messaging service. The recommended posts may be determined to be likely relevant to a user, but may be submitted by authors that the user has not heard of or agreed to follow. The recommended posts may be seamlessly integrated into a stream of posts that are provided for display to the user, providing the user a single interface for viewing both subscribed posts and recommended posts. The recommended posts, however, may include a badge that indicates that the posts are recommended posts and not submitted by an author that the user agreed to follow. An indication of a primary signal that was used to identify the post for recommendation may be displayed along with the post. The identification of the primary signal may include selectable interface elements that, upon selection, signal to the messaging service that the user should view additional or fewer posts that are based on the primary signal. Displaying a reason for recommending the posts can build trust in the recommendations and the messaging service.

The addition of recommended posts allows posts that are particularly interesting to break into the stream of posts, even if the user wasn't subscribed to an author of the recommended posts. The addition of recommended posts also enables users that follow few authors to remain engaged with the messaging service as their post streams may not dry up (i.e. appear empty). The use of a social network graph in determining whether or not a post should appear as recommended allows the recommended posts to be more relevant than posts by individuals that are distant in the social network graph. Weighting the strength of relationships in the social network graph based on user interaction enables an effective mathematical "clustering" of individuals that interact frequently, and the propagation of highly ranked posts to other users within this cluster.

Scores for posts may be based, in part, on reputational scores for the authors of the posts. The score for an author can be based, in part, on the score of authors who follow or comment on the followed author. Thus, the "opinion" of authors who are associated with a high score are considered more valuable in determining author scores than the opinion of authors who are not highly ranked. The impact of a following author's score on a followed author can depend on interaction between the users. Thus, "spam" authors may be less likely to bias the author recommendation system. Even if a spammer created dozens of user accounts and had all the accounts follow a particular author, the dozens of accounts are likely to have a low score and unlikely to significantly impact the score of the followed author. Additionally, the spammer is not as likely to log into each of the dozens of accounts and interact with the followed author's posts.

Reputational scores for authors can be further based on a general level of interest (e.g., comments or likes) on posts submitted by the author. The general level of interest may not be specific to a single post but can be calculated based on activity over a series of posts over a period of time. Thus, time-dependent statistical analysis can be used. Passing forward reputational scores of authors can be particularly relevant because most all users of the micro-blogging service are both content generators and content viewers. Thus, authors (and thus the author's posts) may be scored based on the activities of users that view the posts.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
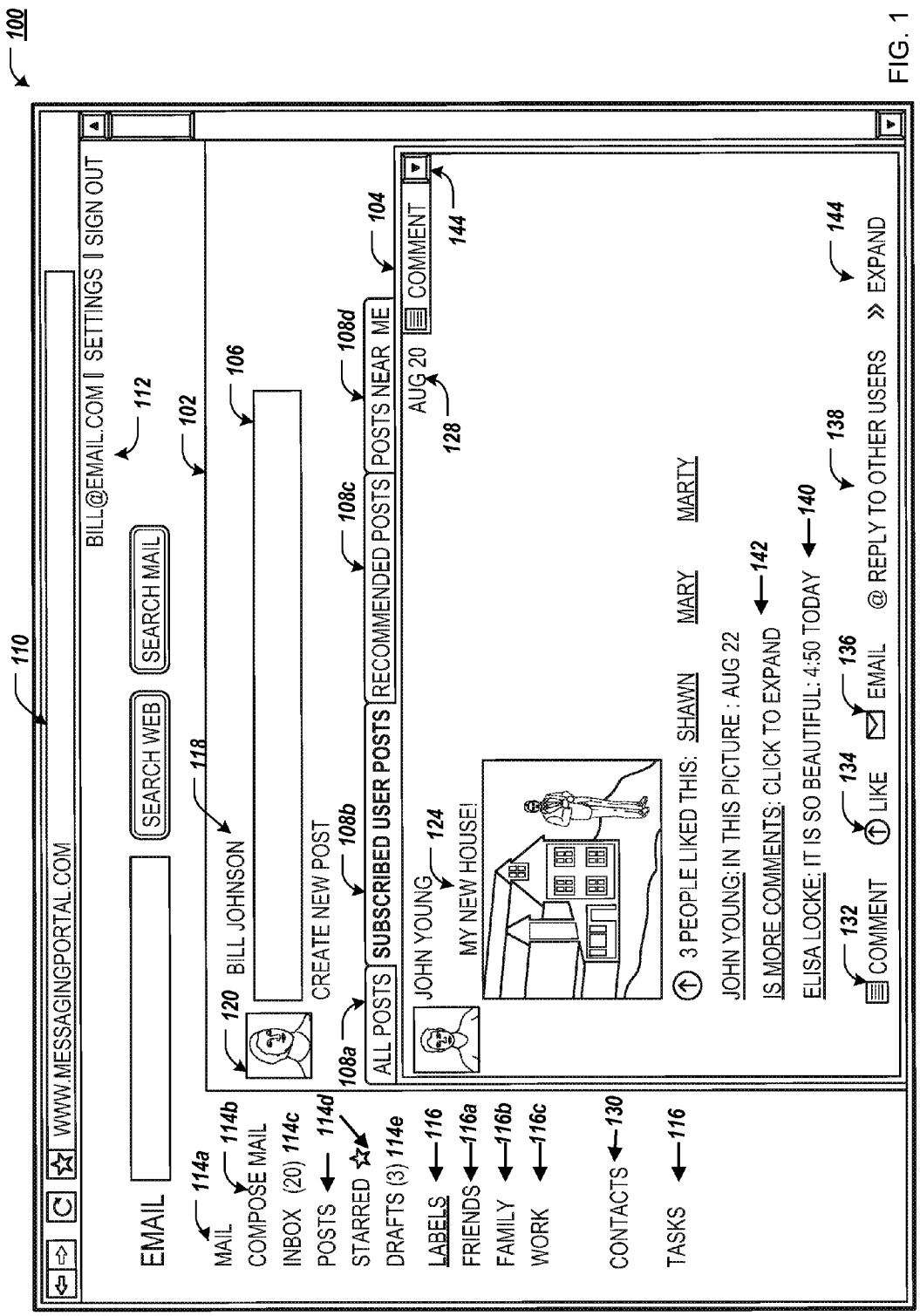
FIG. 1 is a screenshot of an example web-based messaging system interface.

This document describes techniques, methods, systems, and mechanisms for recommending posts in a messaging service to users that do not subscribe to an author of the post, and for scoring authors of posts. In general, a user of a computing device may submit short textual or multimedia posts to a server system that is hosting a micro-blogging service. The server system may disseminate the posts to computing devices of other people that use the micro-blogging service. In particular, some people may "follow" or subscribe to the user, so that when the server system receives a post from the user, the server system distributes the post to these other people. The post that is received from the user may not include information identifying these other people. The post may only include an identification of an author of the post, which the server system may use to identify from a database the subscribing users. The user may never transmit a communication that identifies the subscribing users. The server system may only receive identification of the subscribing users in communications that are from the subscribing users.

The other people that subscribe to the user may view the user's post by logging into a website that displays, for each individual other person, a stream of posts that the micro-blogging service pushes to the individual person (i.e., a computing device that is associated with the user). Each stream of posts may include posts that are authored by other users that the other person "follows" or "subscribes." Also, the stream of posts can include posts that the micro-blogging service recommends for the other person, even though the other person has not affirmatively agreed to "follow" an author of the recommended posts.

One aspect of the messaging service relates to providing recommended posts to a user of a messaging service, where the user has not agreed to follow or otherwise subscribe to an author of the recommended posts. As an illustration, Bill (a user of a micro-blogging service) visits a website that is hosted by the micro-blogging service, creates a user account, and logs into the micro-blogging service using his new user account. The micro-blogging service can provide for display a stacked list of textual posts that is unique to Bill's user account. For example, Bill can use an account search feature of the website to locate the user name of a friend, and select a button that says "subscribe" or "follow." In response, an electronic communication that identifies the friend as a subscribed author is transmitted from Bill's computing device to a server system that hosts the micro-blogging service. In this manner, Bill can subscribe to many users of the micro-blogging service. The server system may store identifications of the subscribed users so that Bill's posts need not identify the recipients of the posts. The server can identify the recipients and distribute the posts accordingly.

After subscribing to the users, Bill returns to an inbox page of the micro-blogging service website. The inbox page may be empty because Bill just recently subscribed to users, so Bill decides to run out and grab groceries from the store. After Bill returns home from the store he notes that the inbox includes several posts authored by users to whom Bill has subscribed. In particular, 43 minutes ago Frank posted "I love these tacos!, (Taco Warehouse)," and 12 minutes ago Fabio posted "If anyone wants to buy a car, let me know. I just crashed my sports car into a tree :-(, (Miami City Hospital)." The inbox also includes a post that Fran posted 5 days ago, however, Carl (a user who received Fran's post, but is not a friend of Bill) commented on the post within the last 10 minutes, thus invoking a subsequent round of distribution of the post, this time with the comment included. Fran's post states "I love this restaurant, (Pizza Emporium)" and Carl's recent comment states "You are so right!!!, (Pizza Emporium)."

In addition to the posts by Frank, Fabio, and Fran (users that Bill explicitly agreed to follow), Bill's inbox includes a single post by Ron. Bill does not follow Ron, and the micro-blogging service transmitted Ron's post to Bill for display as a "recommended" post. Recommended posts may be posts that are determined to be of potential interest to Bill, and may be accompanied by a badge or other graphical interface element that provides Bill a visual indication that the posts are not authored by a user that Bill subscribes to. Each recommended post badge may be accompanied by text that describes why the micro-blogging service recommended the post to Bill. For example, Ron's post may be accompanied by text that states "Ron is a top poster in San Francisco." Ron may post often from within San Francisco municipal boundaries, and Bill may have identified in settings San Francisco as a home address.

As Bill continues to use the micro-blogging service over the next few weeks, several dozen of the hundreds of posts in his inbox may be "recommended" posts. The micro-blogging service website may tell Bill why the posts were selected to be recommended to him, but Bill may otherwise not have any part in the selection of the posts as recommended posts. Behind the scenes, however, a recommendation service can flag posts as recommended for Bill based on several criteria.

In some examples, every post that is submitted to the micro-blogging service is assigned a global score. The global score can be determined based on a multitude of signals, for example, a number of comments that the post receives, a number of "likes" that users have selected for the post after viewing the post, and a reputation of the author of the post (as discussed in more detail later). The score for each post may be weighted against a position of the post's author in a social graph, to determine if the post should be provided to Bill as a recommended post.

A social graph can identify a distance of relatedness between two users of the micro-blogging service. For example, if Bill is does not follow Ron, but Bill follows Frank who follows Ron, Ron may be considered a "friend of a friend" of Bill, a "once removed friend" of Bill, or a friend with one degree of separation. The distance can be identified as a minimum number of individuals connecting any two users of the micro-blogging service. For example, a distance of 1 can indicate the relationship between Bill and Ron (friend of friends), where a distance of 0 can indicate a relationship between Bill and Frank (direct friends).

In some examples, each relationship can be assigned a strength. For example, Bill and Frank may not interact much (e.g., by commenting on each other's posts or sending private message back and forth), so a strength of their relationship may be 0.3. Frank and Ron, however, may interact daily so that a strength of their relationship is 0.8. The strength of the relationships may be used to modify the distance score or generate the distance score. For example, the distance between Bill and Frank may be 0.7 (0.3+0.8/2). The 0.8 strength may be divided by 2 to weight the relationships that are farther away from Bill less than relationships that are closer to Bill. For example, each level of abstraction from Bill may decrease a weight applied to the strength of the relationship The social distance between Bill and other users can be used in connection with a post's global score to determine if a particular post should be provided as a recommended post for Bill. In some examples, a particular post's global score (e.g., a post score that is based off several factors and that may be determined for all users or for a set of users) is multiplied by, divided by, or summed with a distance between Bill and an author of the particular post to generate a modified score. In some examples, the modified score may need to exceed a threshold value (e.g., 50) in order for the associated post to be recommended. In some examples, a post may need to have a modified score that is highest ranking over a given period of time (e.g., 30 minutes) to be identified as a recommended post.

Using both social distance and post scoring in recommending posts may increase a likelihood that recommended posts are interesting to the user. The posts may likely be interesting because of each post's high score, and also because the post was submitted by someone that is close to the user in the social graph. A close social graph distance between users can be useful in identifying content of interest because users in social networks that have similar interests may cluster together, subscribing to content feeds from users with similar interests. For example, Bill may be more interested in what his friends' friends are saying than what a random user in Russia is talking about (even though the Russian user may be submitting posts that are scored higher than posts by Bill's friends of friends).

In some examples, a personal score for each of Ron's posts is generated for Bill. The personal score may use any of a number of statistical criteria associated with the post, but instead of weighting an overall score based on a social network distance between Bill and Ron, the personal score may be generated by weighting individual signals or factors that are subsequently combined to generate the score. For example, one of dozens of signals that may be used to generate a personal score for one of Ron's posts may be a number of comments that the particular post has received. This portion of the personal score may be weighted using a social network graph on a per comment basis. For example, if five comments for the particular post are submitted by friends of Ron, this quantity of five comments may have a greater positive impact on the personal score for Ron's post than if the five comments were submitted by individuals that are friends of friends of friends of Bill.

Thus, instead of modifying a global score with a social distance, the "comments" portion of the score is itself calculated based on where in the social graph the users that supplied the comments are located in relation to Bill. Similar signal-specific weighting can occur for other signals (e.g., a number of followers of Ron, number of likes that a post by Ron receives, and whether content in a post is similar to content by closely related friends of Bill).

Another aspect of the messaging service includes a determination of an author's score, which may be used as one of many factors in determining a score for a post and if the post should be recommended. The reputation of an author can be determined based on several factors. Example factors include: (i) a number of comments that the author has received on his posts, (ii) a number of likes that the author has received on his posts, (iii) a number of followers that an author has, (iv) a length of the comments that are received on the author's posts, (v) a length of the author's posts, (vi) a number of unique commenters to the author's posts, (vii) content of the author's posts, (viii) content of the comments to the author's posts, (ix) score of pages that are affiliated with the author's user account, and (x) statistical information regarding whether the author is associated with spam activity. Some of the factors may be scored for a history of the account, for a recent time period, or for an average of several recent time periods (e.g., an average count of comments received during a history of an account, during a past month, or an average of the amount received during each of the last 5 months).

An author's score may be based, in part, on the score of authors who have agreed to "follow" the author, so that the followed author's posts are received in the following authors' activity feeds. As an illustration, suppose that over a period of several months Bill finds a niche submitting posts about odd happenings at his work place and several highly scored users agree to follow Bill (e.g., Britney Spears and Moby agree to follow Bill). Assuming that Britney Spears and Moby are highly scored authors, Bill's reputational score can be increased based on the high score of Britney and Moby. For example, Bill's score may increase more than if two of his buddies from work were following him. This mechanism for weighting scores based on the scores of authors can utilize mechanisms from or similar to the well known PAGE RANK algorithm.

Weighting authors' scores based on the scores of following authors may combine PAGE RANK concepts with distinctive and particularly relevant characteristics from a micro-blogging context. PAGE RANK algorithms may base a quality of a document off of a quality of documents that include a hypertext link to the document. The scoring of authors, as described in this specification, weights a reputational score of an author based on a score of the following authors. An agreement to follow an author, however, may be more significant than a link between pages. When a user follows an author, that user may receive—in his activity feed—posts that are generated by the followed author. If unwelcome, posts from a followed author may be considered intrusive and the user may choose to cancel his subscription to the author.

To the contrary, placing a hypertext link on a webpage may require little effort and may occupy only a few characters on a page that is designed for display to others (and thus may not impact the page author in a same manner). A quality of a webpage based on PAGE RANK mechanism may score the pages based on the opinions of other content generators (i.e., the authors of the webpages). In contrast, in a micro-blogging context, following users are also individuals that may be forced to be consumers of the content to which they subscribe. Thus, a subscription may be considered a more valuable mechanism for transmitting scores than an unobtrusive link between pages. A subscription may be considered an active indication that one author enjoys the subscribed author's content or is at least willing to have the content that is created by the subscribed user forced into the subscribing user's activity feed.

Additionally, interaction between a following author and a followed author's posts may be observed and used to weight a connection between the following author and the followed author. If the following author "ignores" or filters from display the followed authors posts, the connection may be weighted less. On the other hand, if the following author comments, likes, or clicks to expand or separately view posts of a followed author, the connection may be provided greater weight. The weighting may also be based on a number of posts that the followed author submits for dissemination to the following author. Thus, if the followed author posts dozens of times a day and the following author still remains subscribed to the following user, the connection may be provided greater weight that if the followed author posted every few months. The weights can be used in determining how significantly a following author's score impacts the followed author's score.

Thus, not only do author's scores propagate through a social network of micro-blogging authors based on an explicit agreement to view content generated by other authors, but the scores may originate based on feedback from other users (e.g., a number of comments on the following author's own posts). A subscription may be a threshold for propagating an author's score forward, but an impact of the propagation can depend on the interaction between the following and followed user (e.g., the following author commenting on, liking, or viewing in non-summarized form the followed author's posts).

FIG. 1 is a screenshot of an example web-based messaging system interface. The interface 100 can be viewed by a user of the micro-blogging system after logging into the user's account. The interface can enable the user to submit posts and receive posts from other people. In this illustration, Bill Johnson has logged into the messaging interface 100 and is viewing, in the content region 102 of the interface, a post 104 from John Young. Tabs 108a-d allow Bill to view differently filtered lists of posts. Bill can submit a post using the input area 106.

More specifically, Bill can visit the messaging interface 100 with an internet browser by typing a URL associated with the portal into the address bar 110. Bill may be prompted to enter his username and password before he is provided use of the interface 100. Upon having logged in, the user account 112 that Bill is logged into may be displayed in the interface window.

User-selectable interface elements allow Bill to toggle presentation of content in the content region 102 of the interface. If Bill selects the "Mail" link 114a, a list of received email messages may display in the content region 102. Selection of "Compose Mail" may invoke presentation of an interface for sending emails (e.g., by typing an address of a user, typing a subject, typing textual content, and clicking a submit button). Selection of the "Posts" link 114d may invoke the micro-blogging service interface displayed in the content region 102.

The micro-blogging interface can display a name 118 and picture 120 of the user that is associated with the account 112. In this illustration, the name "Bill Johnson" is associated with the user account "Bill" for the micro-blogging service domain "email.com." The input area 106 of the micro-blogging interface may allow Bill to submit content for dissemination to other users of the micro-blogging service. For example, Bill may move a mouse cursor over the input area 106 and click in the input area 160. Upon selecting the area, Bill may type a textual string of characters "I just had the best day ever, and want everyone to know it!" The characters may appear for display in the input area 106.

User-selection of the input area 106 may invoke a display of controls for adding multimedia content to the input area, or for inclusion in the post. For example, graphical user interface elements may appear after Bill clicks in the input area 106. The graphical user interface elements may enable Bill to add a picture to a post or a video to the post, either by selecting a source file on his computer or identifying a source file from a location on the internet. If Bill types or pastes a Uniform Resource Locator (URL) in the input area 106, a server system hosting the messaging interface (or code operating locally at Bill's client device) may identify the string of characters as a URL and fetch content from the URL for inclusion in the post. For example, the messaging service may present a list of pictures that are drawn from a source document that is associated with the URL, and Bill can select a subset of the displayed pictures to include in the post that he is composing. Thus, a summary of content that is drawn from a URL may be displayed in the user interface. Bill may then select portions of the content to include in the post (e.g., individual pictures or text).

When Bill is satisfied with the post that he has generated in the input area 106, Bill may select a "Post" graphical interface element. In this example, the "Post" interface element is not displayed in the screenshot 100, and is provided for display upon user-selection of the input area 106. After selection of the "Post" interface element, Bill's post is transmitted by his client computing device to a server system that hosts the micro-blogging messaging service. The server system may identify users that have agreed to receive Bill's posts, and may transmit an instance of Bill's post to each user.

In some examples, the "post" may include only the textual and multimedia content that is visible to Bill, or the textual and multimedia content that is viewed by the recipient users. Thus, a description of all post content may be made by a person if the person can display a screenshot of either Bill's display or a recipient user's display. In other examples, the "post" includes additional information necessary to transmit the post, and for the server system to handle the received post. For example, the additional information may include an identifying number for Bill, a source uniform resource identifier (URI) for multimedia content, etc. The additional information may not be visible to Bill or recipient users. In some examples, a post does not identify users or user accounts to whom the post should be transmitted or disseminated.

The micro-blogging interface also displays posts from other users. For example, in the illustration depicted in FIG. 1, a single post 104 from the user John Young is displayed. John's post may be a most recent post or most highly ranked post of several posts that may be viewed by scrolling down in the interface using the scroll bar 122. John's post can also be referred to as an "activity" because the post, while originating with content from John, may be expanded with content from other users of the micro-blogging service. For example, in this illustration John's post included the title "My New House!" 124 and a picture 126 of his house. John's post did not include any additional content and was submitted on the date 128 of August 20.

John's post was received by the micro-blogging service's server system and disseminated to the other users of the micro-blogging service that had selected John as an individual that they would like to follow. For example, Bill may have selected the "Contacts" link 130 and entered into an input box John's email address and name. The micro-blogging service may have identified that John's email address was associated with a micro-blogging account and Bill may have requested to subscribe to John's posts. In some examples, John is prompted to confirm that Bill may receive his posts before John's posts are disseminated to Bill.

John's post also shows that three people (Shawn, Mary, and Marty) "Liked" John's post. A "Like" is an indication, by a recipient of a post, that the recipient has a favorable opinion of the post. A like may be invoked by a single-input user selection of a graphical interface element (e.g., the "Like" button 134).

John's post also shows that on August 22, a user tagged or otherwise indicated that John Young was in the picture of the house. In this illustration, a user that tagged John is not identified, however, a visual identification of a tagging user may be provided, in some examples.

John's post includes a display of a comment 140, "It is so Beautiful" by Elisa Locke at a time of 4:50 today. Elisa Locke may have received a display of John's post in a micro-blogging interface similar to the one depicted in FIG. 1 Elisa may have selected a comment button 132 and entered the text "It is so Beautiful" into a comment input box. Upon sending the comment, John's post may be updated to include Elisa's comment (as illustrated in post 104), and the updated post may be re-disseminated to all post recipients. John's post also includes an interface element 142 that enables Bill to expand a display of John's post to show comments from other users that are collapsed in the present view.

The messaging interface 100 includes mechanisms for Bill to interact with John's post. For example, Bill may select the comment interface element 132, and in response, user interface elements and controls may appear that enable Bill to generate and submit textual or multimedia content for inclusion in the post. The comment is distributed to all users that received the post so that when these other users view the post they see Bill's comment. The post may be updated for all users, whether the users have viewed the post previously or not.

Bill can also select a "Like" interface element 134 to indicate his favorable opinion of the post. Selection of the "Like" interface element 134 can impact a scoring of the post (potentially increasing a likelihood that the post will be displayed to other users as a recommended post), alert other users that Bill thought that the post was interesting, and be used to develop a personalized model of posts that Bill likes (to aid in providing relevant content as recommended posts for Bill's account).

Bill may add other people to the post. For example, Bill may select the "@ Reply" interface element 138. In response, graphical interface elements and controls may display that enable Bill to identify other users of the micro-blogging service. Other users may also be added to the post without Bill providing explicit user-input to add them. For example, Bill may tag "Bob" in a photo that is in the post and Bob may be automatically added to the post. Upon receiving identifications of these other users from Bill's client device, the micro-blogging service may add the other user's to a list of post recipients. Thus, John's post 104 may appear in the @replied users' post streams. The new, @replied users may be enrolled as subscribed to the specific post so that the new users are informed or able to view all new activity on the post (e.g., comments, likes, content added by John, etc.) The new users may be subscribed to the particular post, but may not be subscribed to the post author.

In some examples, when an @replied user receives a post, the received post may indicate the user that shared the post with the @replied user. For example, the post may state "Susan reshared this post with you." A post can also display a history of sharing. For example, the post may state "Susan reshared this post from Jill who had reshared the post from Bob."

As another option, Bill may email the post by selecting the email interface element 136 and entering an individual's email address. In response, the post content may be emailed to the individual's email account. The recipient of the post content may not be subscribed to the post (as with an @reply where updates on the post content are viewed with the received email message). The email message, however, may include a link or other mechanism that enables the user to subscribe to the particular post.

The "Expand" option 144 may enable Bill to expand John's post 104 so that all content associated with the post 104 (e.g., all content that he submitted, all comments, etc.) may be viewed at a single time in an expanded form. The post may increase in size within the interface 100 or may appear as a separate "pop-up" box that is overlaid on the interface 100. In some examples, the post 104 displays all users that are subscribed to the post, and whether the users subscribed to the individual post, follow the post author, were recommend to the post, or were @replied to the post. In some examples, users can select additional features through the drop down interface element 144. Example features can include an ability to delete the post from the user's stream, ignore additional activity on the post so that the post does not jump to the top of the user's stream with every comment, subscribe to the author of the stream, and unsubscribe the author of the stream.

As illustrated, John's post may not be solely static text or multimedia content that was submitted by John for dissemination to other users. The users that received the post may be able to comment on the post, add content, tag people in pictures or videos, and add other users to the post. Thus, the post may also be referred to as an "activity" that originates with John as the author, but may grow in content as other users contribute content to the activity.

The messaging system interface 100 includes several tabs 108a-d for switching "views." Each view may include a different set of posts. For example, each view may apply a different filter to the overall set of posts that Bill has received. The "All Posts" tab 108a may display all posts that the micro-blogging service has provided to Bill's account (e.g., because he subscribed to the author or subscribed to the post, or the post was recommended for display to Bill). The "Subscribed User Posts" tab 108b may display posts for authors that Bill has subscribed to, but may not include a display of posts that were recommended for Bill. The "Recommended Posts" tab 108c may include a display of posts that the micro-blogging system recommended for Bill, but may not include posts for authors that Bill subscribed to.

The "Posts Near Me" tab 108d may include a list of posts that were submitted by users near Bill, either users that Bill subscribes to or all users. For example, Bill may identify a home location or zip code in the settings of the messaging system, or Bill's location may be identified through a Global Positioning System or other location-identification service that is associated with a mobile device upon which Bill is viewing the messaging interface 100. If a place of posting for a post (e.g., John's post) is near Bill's location, John's post may appear in the "Posts Near Me" tab 108d. The "Posts Near Me" tab 108d may also be weighted by time so that only recent posts are displayed (e.g., so that the stream illustrates recent activity around Bill's location). The "Posts Near Me" tab 108d may identify locations of the recent posts as graphical interface elements overlaid on a map.

Figure 2:
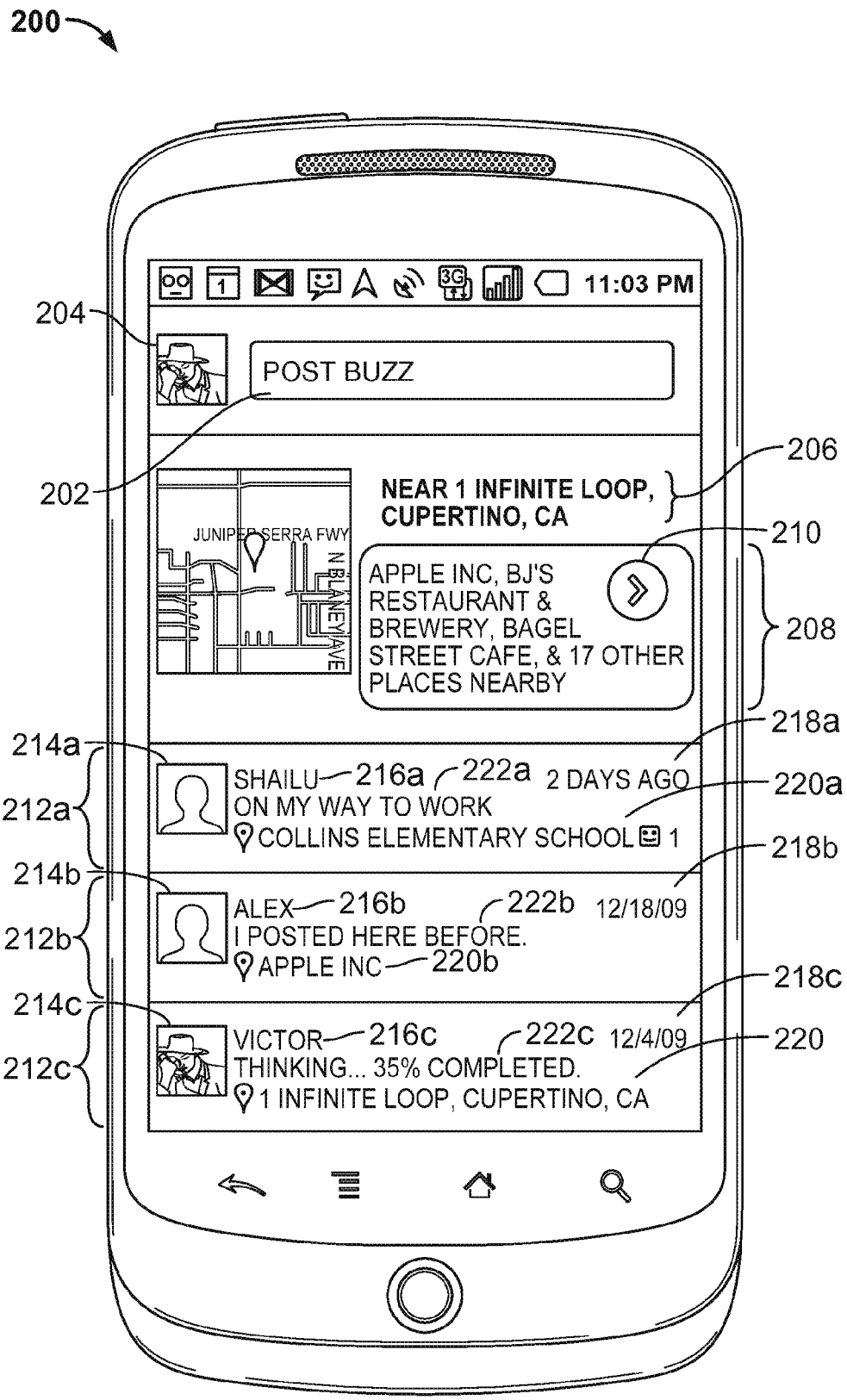
FIG. 2 is an illustration of a micro-blogging application invoked for display on a mobile telephone.

FIG. 2 is an illustration of a micro-blogging application invoked for display on a mobile telephone. The interface 200 can include a picture 204 of the user that is logged into the account, and an input box 202 for submitting posts that are associated with the user account. A present location 206 of the mobile computing device may be displayed in the interface 200. The present location may be identified by location-identification services (e.g., GPS, cellular identification, or Wi-Fi identification). The present location may be coordinates, an address, or a venue (e.g., a commercial business or public place). In some examples, the user can select his venue from a list of venues that are determined by a server system to be near an estimated geographical location of the mobile computing device.

The venues of interest box 208 can display a list of venues that may be near the mobile device's estimated geographical location. Selection of the expansion interface element 210 may invoke a display of detailed information for the venues of interest, or a display that enables selection of any of the venues of interest and subsequent display of detailed information (e.g., an address, map, hours of operation, website link).

The interface 200 may include a display of several posts 212a-c. Each post can include a picture of the poster 214a-c, a name of the poster 216a-c, a date of the post 218a-c, a place of posting 220a-c, and post content 222a-c. The post content may include a summary of original post content. Additional post content by the author, comments by other users, and other post content may be displayed in response to a selection of the post (e.g., by tapping on the post). In some examples, selection of the place of posting 220a-c invokes a display of the location of the place of posting (e.g., on a map). In some examples, the interface 200 for the application program may not be integrated with an email application (e.g., unlike interface 100).

Figure 3:
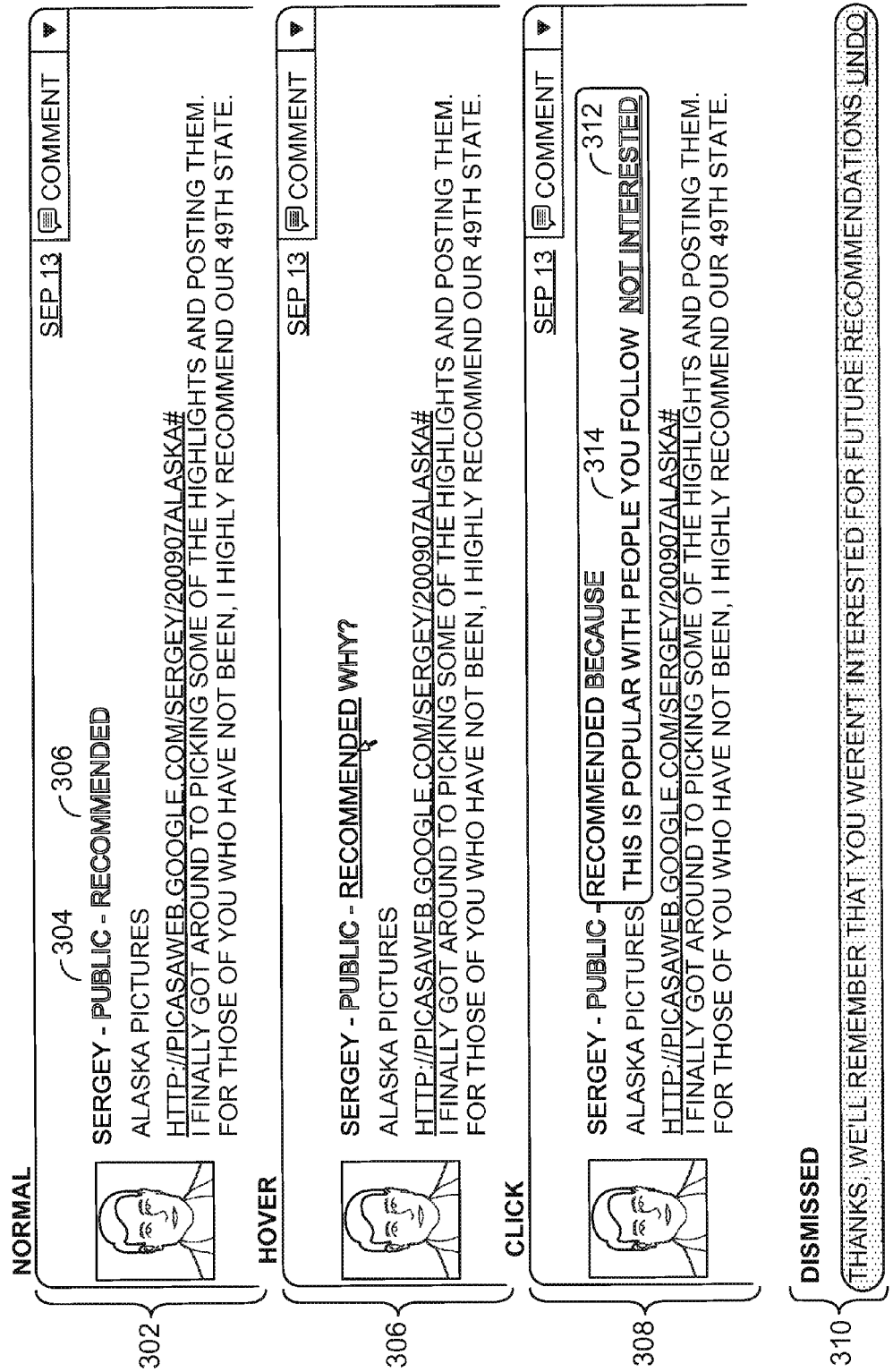
FIG. 3 depicts example displays of a portion of a post and an associated recommendation indicator at four different points in time.

FIG. 3 depicts example displays of a portion of a post and an associated recommendation indicator at four different points in time. The "Normal" view 302 illustrates a post from Sergey that discusses Sergey's trip to Alaska and includes a link to a webpage where the pictures may be viewed. A privilege interface element 304 indicates that the post is "Public" and may be viewed by all users of the micro-blogging service. The post also includes a "Recommended" interface element 306 that indicates to a particular recipient of the post that the post was recommended by the micro-blogging service, and not from an author to which the recipient subscribes.

The "Hover" view 304 illustrates that the "Recommended" interface element includes underlined text upon a hovering of a mouse cursor over the text (e.g., to indicate to the recipient of the post that the text may be selected). An addition of the explanatory text "Why?" also appears.

Figure 4A:
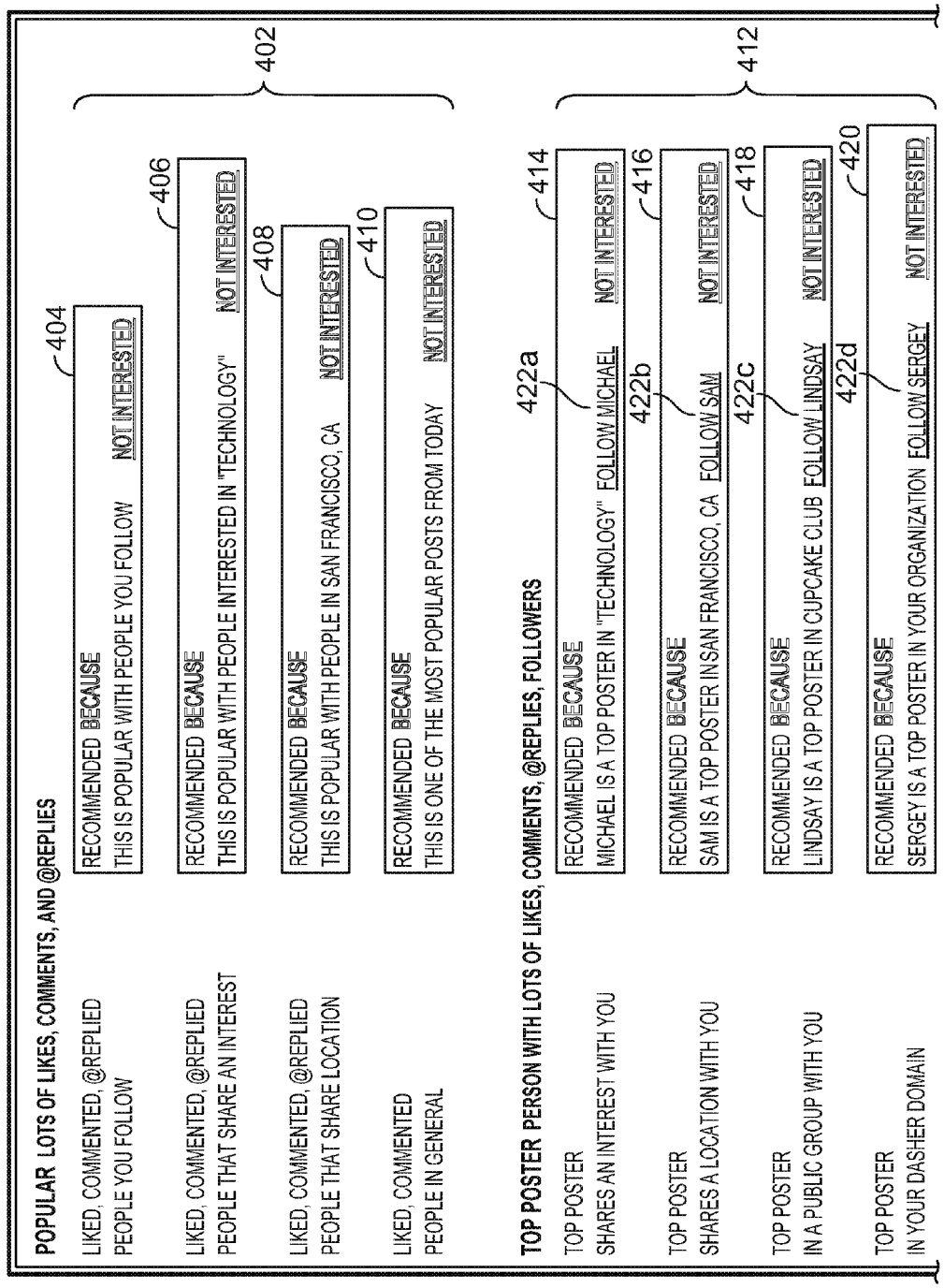
FIGS. 4A-B illustrate different explanatory recommendation dialog boxes.
Figure 4B:
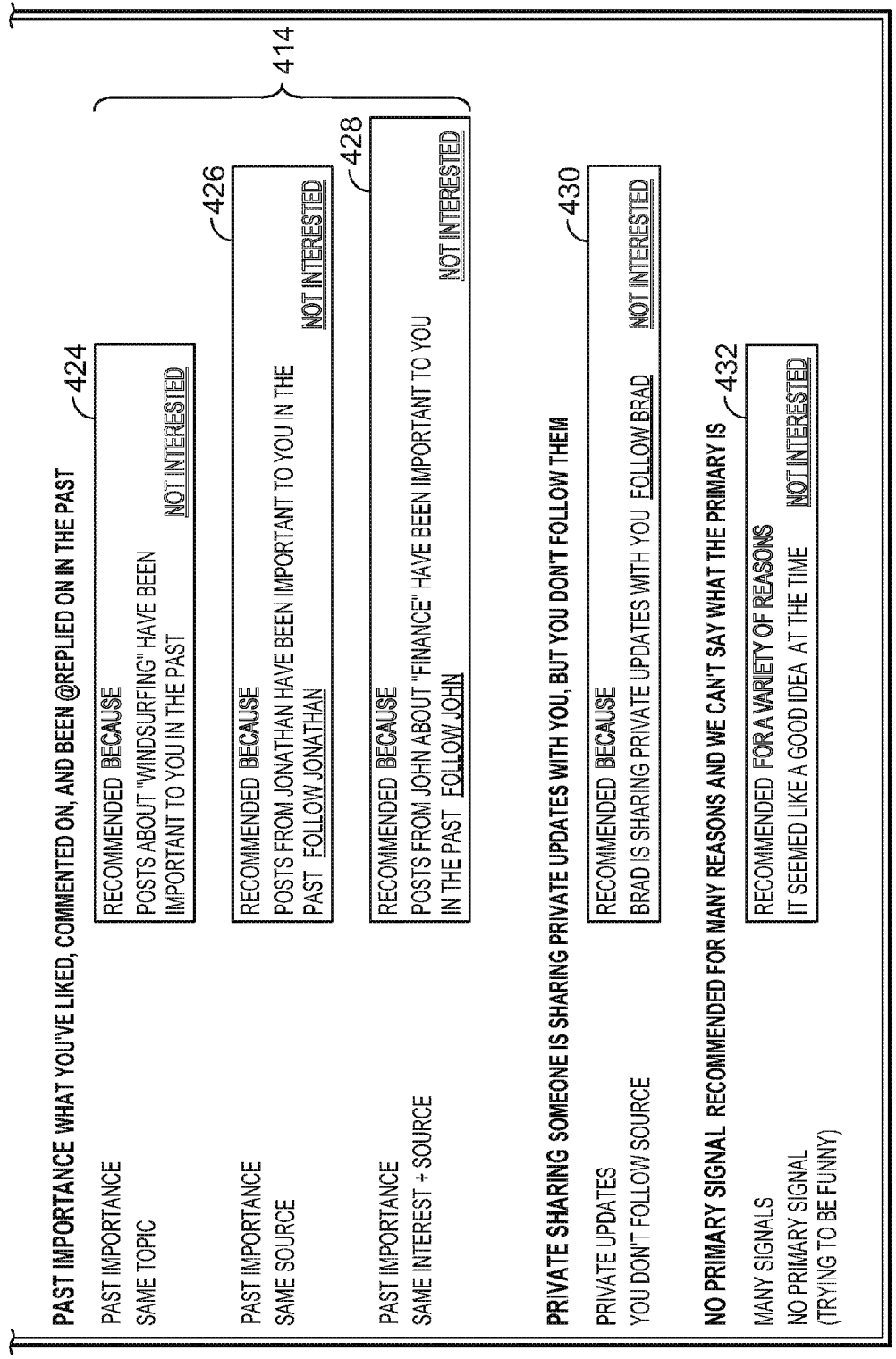

The "Click" view 308 illustrates that, upon user input selecting the underlined "Recommended" interface element, a graphical dialog box expands and includes explanatory text. In this illustration, the explanatory text 314 states that the post was recommended "because . . . This is popular with people you follow." Other examples of explanatory text are illustrated in FIGS. 4A-B. The dialog box in the "Click" view 308 also includes a link 312 that, upon selection, allows the recipient user to indicate that he is not interested in viewing the particular post or viewing posts that are recommended based on the identified reason.

The "Dismissed" view 310 illustrates explanatory text that may appear upon user selection of the "Not Interested" link 312. The micro-blogging service may, in response to a user selection of the link 312, modify criteria so that (i) posts similar to the displayed post are less likely to appear, or (ii) the recommendation criteria that was used to suggest the displayed post (e.g., the criteria described by explanatory text 314) may not be used to recommend posts to the same particular user in the future.

FIGS. 4A-B illustrate different explanatory recommendation dialog boxes. Each dialog box illustrates explanatory text that indicates to a user why a particular post was recommended to the user, and includes a "Not Interested" link. The text to the left side of each dialog box illustrates criteria that may be used to recommend a post that is associated with the dialog box to the right side of the text. In some examples, a post is selected as a recommended post based on a high score, and in response to the selection of the post, an analysis is performed of the post (or the post's score) to identify the primary criteria that resulted in the high score.

The "Popular" recommendation dialog boxes 402 may appear with posts that are recommended based on a high amount of post activity. For example, most of the recommended dialog boxes are displayed to a post recipient when the post is associated with a significant number of likes, comments, and @replies. The post may be "popular" with people in general (as with dialog box 410), or popular specific to a particular type of additional criteria. The additional criteria may be that the activity is provided by subscribed users (as with dialog box 404). The additional criteria may be that the activity was popular with people having a similar interest (as with dialog box 406). The similar interest may be identified based on standing queries, which are discussed below in this document.

The secondary criteria can also be people that share a location (as with dialog box 408). A location can be identified as shared if an author of the post and the recipient of the post have been associated with a same location. A location can be identified if: (i) a mobile computing device that has been used to read or transmit micro-blogging posts has supplied a particular location as a place of posting or a current place, or (ii) a user of the micro-blogging application has identified a particular place in micro-blogging service user settings as a home address or work address.

The "Top Poster" recommendation dialog boxes may appear when an author of a post is determined to be a top poster based on a quantity of likes, comments, and @replies that the author's posts have received, and based on a quantity and quality of followers of the author. In addition, the recommended post may be recommended because it is a particularly high scoring post of the "Top Poster." As with the "Popular" recommendation dialog boxes, a "Top Poster" dialog box may be specific to when a top poster shares an interest with the recipient (as with dialog box 414), or when the top poster shares a location with the recipient (as with dialog box 416). In addition, a top poster may be recommended based on an additional criteria, such as when the top poster is in a same public group as the recipient (as with dialog box 418), or when the top poster is identified as associated with a same organization as the recipient (as with dialog box 420). Additionally, within each top poster dialog box is a link 422a-d that allows a user to select to follow the author of the associated post.

The "Past Importance" dialog boxes may appear when a recommendation is based on historical comments, likes, and @replies that the recipient user has provided. For example, when a user likes, comments on, or @replies to particular posts, a content of the post may be analyzed (e.g., to create standing queries) and a source of the posts may be identified. Thus, a future post may be recommended as including content that is about a topic that has been identified as relevant to the user (as with dialog box 424), or from a source that the recipient has previously comment, liked or @replied (as with dialog box 426). Both a same topic and same source may be used in a recommendation (as with dialog box 428).

In some examples, an author of posts may suggest that another user follow the author or may recommend that another user receive a particular post from the author. If the recommended post or author is highly ranked, the post may appear as a recommended post for the other user (as with dialog box 430). The recommendation dialog box 430 may appear with posts that are @replied to a particular user.

In some examples, the micro-blogging system determines that a particular post should be recommended to a user (e.g., because the post is associated with a high score), but cannot identify a particular reason for recommending the post (e.g., because a number of factors are evenly weighted). In examples where a reason for recommending a post cannot be determined, the micro-blogging system may admit to the user that the post is being recommended for a variety of reasons (as with dialog box 432).

Reasons for recommending a post may be determined based on which component of a recommendation engine provided a recommendation, or based upon a weight of a signal in an overall score that was recommended. For example, a "same topic" recommendation may be based upon recommendations provided by a saved query recommendation engine. A post may be "Popular" if a threshold percentage (e.g., 40%) of a post's score is based on likes, comments, and @replies by other users, while a post may be of "Past Importance" if a threshold percentage (e.g., 40%) of a post's score is based on previous likes, comments, and @replies by the recipient of the post.

Figure 5:
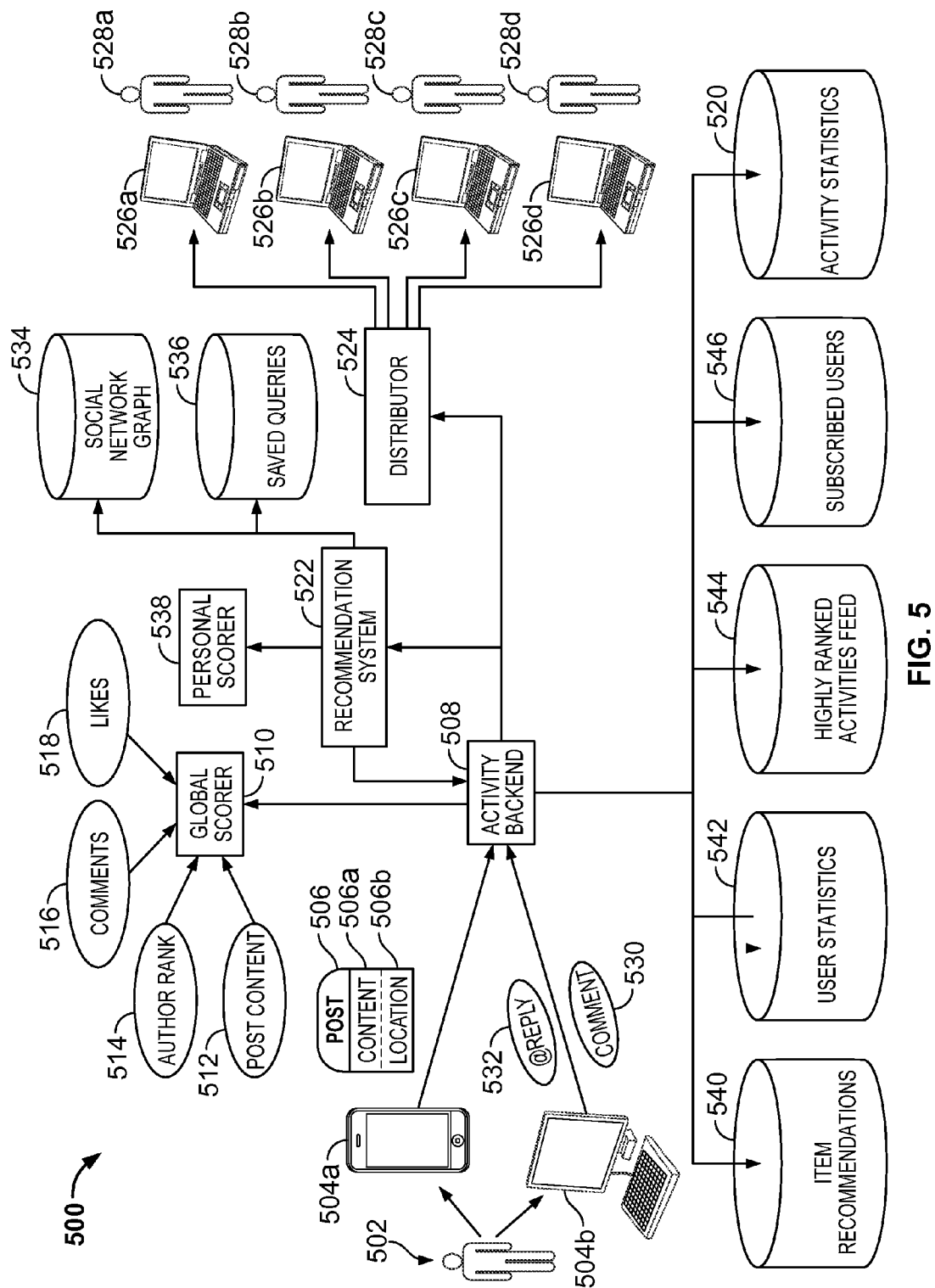
FIG. 5 is an example of a messaging system.

FIG. 5 is an example system 500 of a messaging system. System 500 may be used to recommend posts to non-subscribing users and to score authors of posts. A person author 502 may use a computing device 504a or 504b to submit a post 506 to an activity backend server system 508. The activity backend server system requests that a global scorer 510 generate a global score for the post, and identifies users that subscribe to the author 502 from a subscribed users repository 546. A recommendation system 522 is queried to identify additional users that are to receive the post 506. The post 506 is thereafter disseminated by a distributor 524 to computing devices 526a-d that are associated with respective users 528a-d. Any of the users 528a-d may comment 532 on the post 506, whereupon the post 506 may be rescored and redistributed to the users 528a-d and the author 502.

In more detail, the computing devices 504a and 504b are illustrated as an application telephone 504a and a desktop computer 504b. Other example computing devices can include an in-dash car navigational system, a laptop computer, a netbook computer, a smart telephone, a personal digital assistant, a server, and a desktop telephone. The author 502 types a post using one of the computing devices, for example, by typing on a physical keyboard or tapping keys of a virtual keyboard on a touchscreen display device. The author can submit the post 506 to the micro-blogging service, for example, by pressing a "submit" button. The post 506 may be transmitted over a network to the activity backend server system 508. The network may be a wired network (e.g., the Internet) or a wireless network (e.g., a mobile telephone communication network). The post 506 may include content 506a, for example, textual characters that the author entered with a keyboard, and multimedia content that the author selected using the keyboard. The post 506 may also include a location 506b. The location 506b may be data that identifies an estimated geographical location at which the post was submitted (e.g., geographical coordinates or a street address determined using GPS technologies) or a user-selected or confirmed venue at which the post was submitted (e.g., a restaurant, mall, or city park).

The activity backend server system 508 may receive the post 506 and request that the global scorer server system 510 determine a score for the post 506. The score for the post 506 may be determined based upon several different signals (e.g., statistical data from different sources). Statistical data can be stored in a user statistics repository 542 and an activity statistics repository 520. Example signals include a post content signal 512, an author rank signal 514, a comments signal 516, and a likes signal 518. Any combination of the signals 512-518 may be used to determine a score for a particular post, and a combination may assign varying weights to the signals.

A "Comments" signal 518 may be determined based on multiple different combinations of identified statistical information that relates to comments (or may represent several separate "comments" signals). For example, a number of comments that the post has received may be identified. The post may not have received any comments if the post is being broadcast for the first time by the author 502, but the post may have associated comments if being rebroadcast after receiving comments or likes. A number of unique commenters may be identified. Thus, subsequent comments by a same commenter may be disregarded in scoring or provided less weight than an initial comment by a commenter.

A length of the comments may be identified and content of the comments may be analyzed. For example, comments that include 150 characters and multimedia content may count for more than a short comment that says "Awesome!" without any multimedia comment. Comments that are identified as spam or link to spam sites may be discounted. Comments may be analyzed against a historical amount of comments submitted by a particular user so that comments by a relatively quiet user are weighted more heavily than comments by a user that comments on most all posts that he receives. A number of comments for the post 506 may be normalized against an average amount of comments that a post by the user 502 receives (either an absolute number or at a similar age of the post 504). Thus, even though a user may receive 843 comments on a particular post, the post may not be associated with as high of a score because the user may be particularly popular and typically receive several thousand comments.

A "Likes" signal 518 may be determined based on multiple different combinations of identified statistical information that relates to likes (or may represent several separate "Likes" signals). Statistical information that is specific to likes, but is otherwise similar to the statistical information described above for comments, may be used. However, because a like may be a binary signal (e.g., either selected or not selected), a content of likes may not be analyzed as with comments. An activity statistics repository 520 may include the described statistical information on comments and likes for the post 506.

A "Post Content" signal 512 may be determined based on multiple different combinations of identified statistical information that relates to post content (or may represent several separate "Post Content" signals). A length of the post may be identified and post content may be identified. For example, a post that includes 120 characters of text and includes a link to www.cnn.com may be assigned a higher score than a post that includes 35 characters of text and a link to www.johnspersonalwebpage.com. Thus, a ranking of a website by a search engine may be used to boost the score of a post (assuming in this illustration that www.cnn.com is more favorably ranked than www.johnspersonalwebpage.com). An inclusion of multimedia content (e.g., videos, pictures, or widgets) may increase a score of the post.

An "AuthorRank" signal 514 may be determined based on multiple different combinations of identified statistical information that relates to an author's reputation (or may represent several "AuthorRank" signals). AuthorRank is discussed in more detail with regard to FIG. 7.

The activity backend 508 may query the subscribed users repository 546 to identify a list of users that have subscribed to the author 502 or the post 506. The activity backend 508 may subsequently request that the recommendation system 522 identify users that are not subscribed to the author or post, and that are to receive the post 506 as a recommended post (such users are referred to herein as recommended users).

In some examples, the recommendation system 522 identifies recommended users using statistical information (e.g., the global score or any combination of the signals 512-518) in combination with a social network graph 534 to determine particular recommended users. In general, the recommendation system 522 may weight a global post score, individual signals, or a threshold for recommendation based on a distance between an author of a post and a potential recommended user. If a score for the post exceeds a threshold (either of which may be modified based on the social network graph distance), the post 506 may be provided to the recommended user.

Figure 6A:
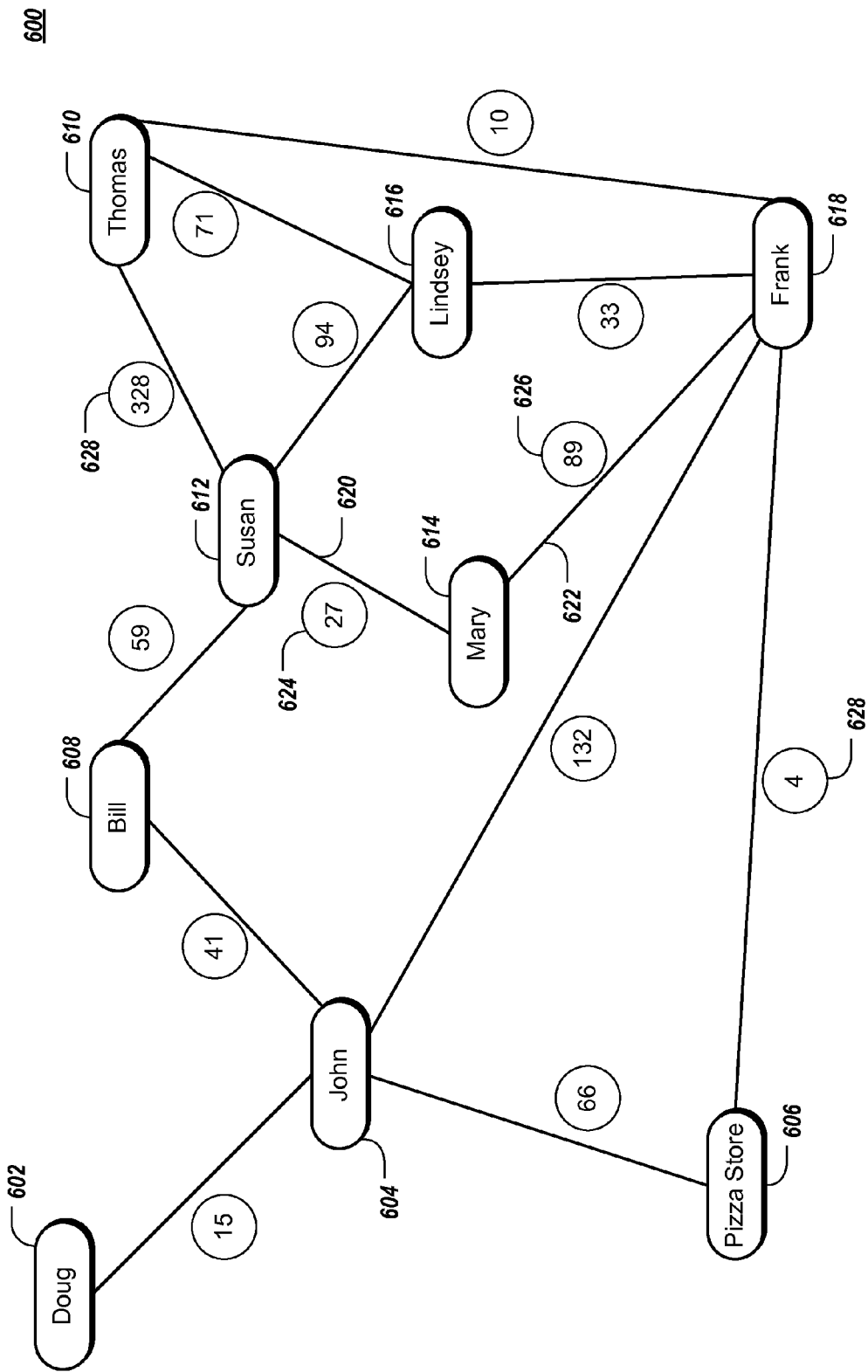
FIG. 6A is a schematic illustration of an example social network.
Figure 6B:
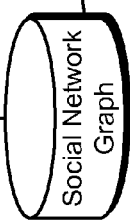
FIG. 6B illustrates an example data structure that represents a social graph.

An example social network graph is illustrated in FIGS. 6A-B and an explanation of a social network "distance" is discussed in relation to FIGS. 6A-6B. FIG. 6A illustrates a schematic illustration 600 of an example social network. Each of the nodes identifies a member of the social network and each edge between the nodes represents a relationship between the members. Each relationship may be accompanied by a number that identifies a strength of the relationship.

As an illustration, node 614 ("Mary") is identified as directly related to nodes 612 ("Susan") and 618 ("Frank"). Thus, Susan and Frank are identified as friends or acquaintances of Mary and the edges 622 and 620 represent acquaintance relationships. An acquaintance relationship can be formed: (i) if either of the users requested to subscribe to the another user of a micro-blogging service, (ii) if the other user acknowledged the request, (iii) if a user has commented on a post by another user of the micro-blogging service, or (iv) if one of the users is in an address book stored for the other user (e.g., Mary's messaging system may have an address book that is independent of Mary's subscriptions, but identifies individuals that Mary has emailed or has stored as contacts of interest). Thus, several mechanisms may exist for generating an acquaintance relationship between users.

A strength of an acquaintance relationship may depend on the mechanism for generating the acquaintance relationship or a subsequent frequency and type of contact between the users. For example, a relationship where both users subscribed to each other may be stronger than a relationship where only one of the users subscribes to the other user. A relationship where one of the users subscribes to the other user may be stronger than a relationship where the one user includes the other user in an address book of contacts, but does not subscribe to the other user. A relationship where a user includes an address of the user in a contact book, may be stronger than a relationship where a user once emailed another user but did not add that other user to his address book. A relationship where a user commented a single time on a post of another user, but did not subscribe to the other user, may be stronger than a relationship where the user emailed the other user a single time.

A strength of acquaintance relationship may depend on a frequency of contact between the users. For example, a frequency of contact can depend on how often a user emails another user, comments on the other user's posts, likes the other user's posts, or @replies to the other user's posts. The relationship may be stronger if both users interact with each other than if the interaction is only in one direction. The strength of contact may depend on how recent the contact was. For example, Bill commenting on Frank's posts 52 times three months ago may provide less of an impact on a strength of Bill and Frank's relationship than Bill commenting on Frank's posts 22 times in the last month. In social graph 600, the relationship 620 between Mary and Susan has a strength of 27 (item 624), and the relationship between Frank and Mary has a strength of 89 (item 626).

A distance between two users may not depend only on whether the users are acquaintances and a strength of the relationship, the distance can depend on how many edges it takes to reach the other user. For example, Susan and Frank may be considered "first-order" acquaintances of Mary. "Second-order" acquaintances can include all acquaintances of the first-order acquaintances. For example, because Bill (608), Thomas (610) and Lindsey (616) are acquaintances of Susan (612), and because Pizza Store (606), Lindsey (616), and Thomas (610) are acquaintances of Frank (618), these individuals may be Mary's (614) second-order acquaintances. Third-order acquaintances may be determined similarly (as well as any n-th order acquaintance).

A distance may be a simple determination of the order of the acquaintance. For example, a first-order acquaintance may have a distance of 1, a second-order acquaintance may have a distance of 3, and a third-order acquaintance may have a distance of 9. Conversely, the distance may represent a decreasing value as the distance increases (e.g., 1, 0.33, and 0.11).

In some implementations, the distance value between two users may account for a strength of the relationships, in addition to a number of relationships connecting the users. As an illustration, the distance between Mary and Thomas, and Mary and the Pizza Store may be computed. Although numerous mechanisms for weighting distance are contemplated, in this illustration the example strength number and a representation of the number of relationships are simply multiplied. A distance between Mary and Thomas is calculated as 1 (a numerical representation of the first-order relationship)*27 (the first-order strength)+0.33 (a numerical representation of the second-order relationship)*328 (the second-order strength)=166. A distance between Mary and the Pizza store is calculated as 1 (the numerical representation of the first-order relationship)*89 (the first-order strength)+0.33 (the numerical representation of the second-order relationship)*4 (the second-order strength)=90. In this illustration, even though Frank is identified as having a stronger relationship with Mary than Susan, Thomas has a stronger relationship with Mary than the Pizza Store, because the strength of Susan and Thomas' relationship is significantly stronger than Frank's relationship to the Pizza Store. Susan and Thomas may be married and communicate frequently, while Frank may have not communicated with the Pizza store, and may only have the Pizza Store's phone number in his address book.

In some examples, the distance is calculated based on a shortest number of relationships between two users. In some examples, two paths include a same number of relationships. For example, Lindsey is a second-order relationship of Mary through both Susan and through Frank. Lindsey may be treated as though she is closer in the social network graph (e.g., associated with a higher distance value) than if she were only a second-order relationship through only Susan. For example, the distance through Frank may be multiplied by ⅔ and summed with ⅔rds the distance through Susan.

While the social graph 600 is illustrated schematically, a computer may store the graph 600 as a data structure. FIG. 6B illustrates, as table 650, an example data structure that represents a social graph. In this example table, each user 652 is associated with a row of the table. For example, Mary's row 654 illustrates that she is an acquaintance of Susan with a strength of 27, and an acquaintance of Frank with a score of 89.

As mentioned earlier, the calculated distance between an author and a user may be used to determine that the user should receive a post as recommended, even though the user does not subscribe to the author. For example, Mary may subscribe to Frank, but may be related to Susan (also a user of the micro-blogging service) only through Mary's address book. Also, Mary may not subscribe to any individuals depicted in the graph 600 other than some of those illustrated as having a first-order relationship with Mary. Thus, the distance to the non-subscribed users may be used to determine if the Mary should receive a post that the non-subscribed users author.

In some implementations, a score for a post (e.g., a global score for the post) is modified to identify a personal score for an individual based on a distance between the individual user and an author of the post. For example, if Mary authored a post with a score of 24, the score may be personalized for Thomas and the Pizza Store based on the distances that were determined as discussed above. For example the personal score of Mary's post for the Pizza Store may be 24 (post score)*90 (distance between Pizza Store and Mary)=2,160. The personal score of Mary's post for Thomas may be 24 (post score)*166 (distance between Thomas and Mary)=3, 984. If the personal score exceeds a threshold value (e.g., 1,000), the post may be recommended to the user.

In some examples, the threshold is a fixed threshold, or a fixed percentile of the total number of posts. For example, the top one percent of scores for posts may be recommended. In some examples, the threshold may differ depending upon an order of the relationship. For example, a first order relationship may have a threshold of 1,000 and a second order relationship may have a threshold of 3,000. Thus, Mary's post may be recommended to Thomas (e.g., because his personal score of 3,984 exceeded the second-order threshold of 3,000), but may not be recommended to the Pizza Store.

In some implementations, individual signals that are used to calculate a personal score for a post are modified based on a distance between the individual user and an author of the post. As a simplified example, a personal score for Mary's post may be determined based on a number of comments that the post has received (in a complex example, signals other than comments may be used also). In an illustration where the signals are not weighted based on a social graph, the comments score may be based solely on an absolute number of comments that the post has received divided by an average number of comments a post by the author typically receives. For example, if the post has received five comments and an average post by the same author receives two comments votes, the comment portion of the personal score may be assigned a value of 2.5.

In a social graph illustration, the score may be calculated based on scores for each individual comment. Each individual comment can be scored based on a distance between the commenter and the individual for whom the personal score is being generated. For example, if Susan (612) and Doug (602) commented on Mary's (614) post, a personal score that is generated for Thomas (610) may be lower than if Susan (612) and Lindsey (616) commented on Mary's (614) post (e.g., because Susan and Lindsey are both first-order acquaintances of Thomas, where Doug is a fourth-order acquaintance of Thomas). Each individual comment score calculation may be determined based on a score of the comment (e.g., a quality of the comment, or a normalized value of the comment based on how many comments the commenter normally submits) in a mathematical combination with a social network distance between the user to whom the personal score is being calculated and the commenter.

In some implementations, a threshold value that is used in a determination of whether a post is to be recommended to a user is varied based on a social network distance between an author of the post and the user for whom the recommendation determination is being made. For example, a post may be associated with a global score of 90. If the score for the post exceeds a threshold that is calculated for a particular user, the post may be recommended to that particular user. As an example calculation of the threshold, a standing threshold 200 may be divided by 2.3 (an example distance between two users) to provide a threshold of 87. Because the global score of 90 exceeds the threshold of 87 (that is calculated for the individual user), the post is recommended to the user. If the post's score did not exceed the threshold, the post may not be recommended to the user.

Returning to a discussion of FIG. 5, a personal scorer 538 can be a server system or set of algorithms that: (i) modifies a global score that is generated for a post based on personal attributes (e.g., a distance between the post author and an individual for whom the personal score is being created), or (ii) generates a personal score based on component scores that are each individually scored in combination with use of a social network graph, as discussed in more detail above.

In some implementations, posts are generated for a particular user based on one or more queries that are saved for the particular user in a saved queries repository 536. Each query can be a set of words or alpha-numeric characters that are identified as topically relevant to content that the particular user has previously generated or viewed.

In some examples, the queries are generated based on user-selected options. For example, upon a particular user (e.g., Bill) opening his account or going into a settings page for his account, Bill may be presented with a survey or series of topical categories that Bill may identify as categories of interest. A word associated with each category may be added to a saved query for the user. For example, Bill may select a "Cars" option in a settings page and, in response, be presented with a list of various types of cars. Bill may select "Ford" as a sub-option. In response, the saved query for Bill may include the word "Ford."

In some examples, the queries are generated based on user-generated content or user-viewed content. For example, the micro-blogging service may analyze the content of posts submitted by Bill, posts that Bill reads, posts that Bill comments on, the content of Bill's comments, or posts that Bill "likes." Because the user account for the micro-blogging service may be shared among multiple different services that are provided by a single information provider, additional information may be available for use in a determination of a user query. For example, content emails that Bill receives, composes or replies to may be analyzed.

In another example, search engine web queries that Bill submits may be analyzed. Also, landing pages that are associated with responsive search results may be analyzed (either for highly ranked search results, or for search results that Bill selects). For example, Bill may navigate to a general purpose search engine and type into an input box the query "Ford trucks longevity," and in response receive a list of search results that identify portions of content from landing pages that are determined to be responsive to the query. Landing pages may be determined to be responsive to the query if the landing pages include words that are included in the query or synonyms of words that are included in the query. Bill may select one of the search results and Bill's web browser may navigate to a landing page associated with the search result, so that the landing page is displayed on Bill's computing device.

The content may be analyzed by identifying a set of words that are common to multiple different sources of content (e.g., multiple different queries, landing pages, emails, posts, or a combination of these). Words from a repository of truncated words may be removed from the set of words (e.g., the words "the," "a," and "their" may be removed as the truncated words). The repository of truncated words may include words that are commonly used in a language or dialect (e.g., the repository may include a 500 most commonly used words in a particular language). The repository of truncated words may also include words that were not determined to be of interest to users. For example, if the word "box" is not a commonly used word, but posts that are recommended based on the use of the word "box" are rarely "liked," @replied, viewed in expanded format, or commented on, the word box may be added to the truncated repository.

In some examples, the content of websites that Bill has generated may be analyzed. For example, Bill may be identified as the author of several different websites that are about "Jogging." The websites may include text that describes jogging and links to other jogging websites. Saved queries may also be generated, in part, by analyzing the content of the websites that Bill is identified as having generated.

A saved query for a particular user may be used in a query of posts submitted by users of the social network. In some examples, the query is run against posts within a pre-determined social network distance of a user. For example, the query may be performed against all authors of posts that are within a distance of 180, or are a third-order user or closer to a particular user. A post may be responsive to the query if the post includes the query terms, and a post may be scored based on the query terms using mechanisms similar to mechanisms employed for scoring landing pages in response to search engine queries. Posts may be selected by the micro-blogging service as a post to recommend if the post is identified as responsive to the query and within the particular social network distance. In some examples, posts may also need to have a query score that is above a threshold value. For example, if a long post includes a single reference to a query term, a query score for the post may not satisfy the threshold.

The users that are recommended for a particular post may be added to the subscribed users repository 546 as subscribed to the particular post. Thus, when the activity backend receives new activity for a particular post (e.g., comments on the post), the activity backend can identify all users to which the new activity should be provided. In this manner, all users that subscribe to the post author, all users that were recommended the post, and all users that were @replied to the post may receive updates on a post. When a post is updated, it may jump to the top of a user's post feed.

In some examples, user 502 may submit an @reply 532 and comment 530 to the user's own post 506. In some examples, the recipient users 528*a-d* are treated as user 502 when submitting a comment 530 or @reply 532. In other words, the operations described in connection with FIG. 5 may be re-performed upon receiving a comment or like from users 528*a-d*. The post (now with the comment) may be rescored and new recipient users may be recommended.

In some implementations, a highly ranked activities feed repository 544 may include a list of posts that are associated with the highest global scores. Users of the micro-blogging service may be able to subscribe to the highly ranked activities feed to view content that is globally identified as the most interesting.

In some implementations, the post 506 may be submitted through a search engine query input box, for example by typing "z.Hello World." The "z." character sequence may signify to a search engine frontend server system that the trailing text should be routed to a micro-blogging service server system for dissemination to other users.

In some implementations, the post 506 may be routed from a different messaging service. For example, a user of the micro-blogging service may link his micro-blogging account to the TWITTER messaging service, so that posts that he submits on his TWITTER account are also routed to the described micro-blogging service. Similarly, posts that the user receives from users on TWITTER may be routed into a feed for the micro-blogging service. In some implementations, a server system includes all components of FIG. 5 that are not user devices (e.g., all components that are not devices 504*a-b*, and 526*a-d*).

In examples where postings from multiple of a user's sources may be disseminated by the micro-blogging service (e.g., messages that a user posts on the micro-blogging service and messages that the user posts to the TWITTER messaging service), individuals that follow the user may select a subset of the sources to follow for the user. For example, if John subscribes to Bill, John may be presented a list of sources to which Bill's account is linked so that John may indicate which of the linked sources he would like to receive content from. Thus, John may indicate that he would like to view all content that is generated by Bill, except for content that Bill posts to TWITTER (e.g., because John may also separately follow Bill on TWITTER).

Figure 7:
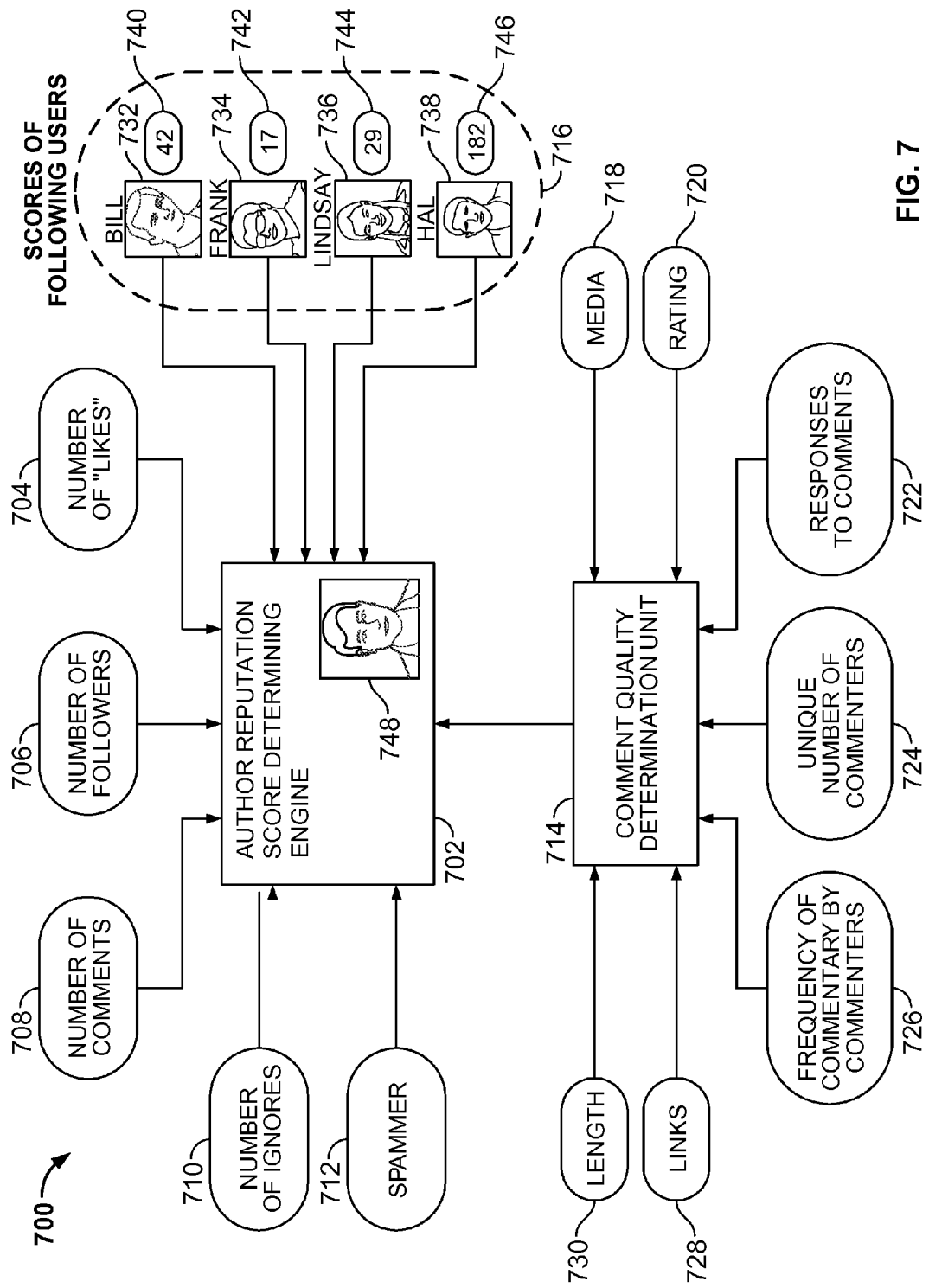
FIG. 7 is an example system for determining the Author-Rank signal.

FIG. 7 is an example system 700 for determining the AuthorRank signal 514 that is illustrated in system 500. The author reputation score determining engine 702 can identify an AuthorRank signal that may be used as one of several factors for determining a score for a particular post. The AuthorRank signal 514 may generally identify a trustworthiness of the author. The AuthorRank signal 514 can be based off of two broad categories of statistical information: (i) other user's interaction with the author's posts and content that the author generates (e.g., signals provided by the comment quality determination unit 714 and signals 704-712), and (ii) scores of users that have agreed to subscribe to the author (e.g., "Scores of Following Users" 716).

The first category of signals (e.g., other user's interaction with the author's posts and content that the author generates) will be discussed first. A number of likes 704 that an author's posts receive may be used to identify a reputational score for the author. For example, a total number of likes, an average number of likes per post, or an average number of likes over a particular time period (e.g., a week) may be used as an input to the author reputation score determining engine 702. Similar analysis for a number of likes provided by unique users may be used (e.g., a number of individual people that like an author's posts over a time period, regardless of how many times a particular individual liked different posts). Similar analysis for a normalized number of likes may be used (e.g., a deviation from a historical trend a particular individual). The described statistical information may be analyzed for a life of a user account, or particular time periods (e.g., the last 15 days). Similar forms of statistical analysis for a number of comments 708 may be used to calculate a reputational score for the author.

A number of followers 706 (i.e., a quantity of individuals that have agreed to subscribe to posts authored by the author) may be used in a determination of an author's reputational score. A number of "ignores" by users may decrease an author's reputation. An "ignore" may be an identification that a user indicated that he does not wish to subscribe to the particular post or particular author anymore. Also, a spammer identification signal 712 may be use in a determination of an author's reputation score. A spammer identification signal 712 may indicate a likelihood that a particular user is a spammer. For example, the spammer signal may indicate if a user account is associated with an IP address that has been identified as a source of spam, if the account is associated with an undue level of posting or activity, if the user's posts or comments include words that have been identified as likely spam (e.g., "get rich quick"), or if the user's posts or comments include links to web documents that have been identified as sources of spam.

In some examples, an amount of sources that each of the number of followers 706 subscribes to the author is used in a determination of the author's reputational score. For example, some of the users may only subscribe to content that the author generates using the micro-blogging service. Some of the users, however, may subscribe to all content that the author generates (e.g., also content that the author generates using the TWITTER messaging service). Thus, the more content that the followers subscribe may indicate a greater interest in the author and positively impact the author's score.

In some examples, a number of the user's posts that get shared with other users (e.g., by @replying the user's posts) influences a ranking of the user. If a post that has already been shared with a user gets reshared (e.g., the individual that receives the @replied post decides to @reply the post to another individual), the post may be more heavily scored and may more favorably impact an author's score than a post that was @replied a single time.

The comment quality determination unit 714 may analyze the content of comments that are received on an author's posts, and provide statistical information for use in determining a reputational score for the author. For example, the comment quality determination unit 714 may analyze a length 730 of comments received on posts by an author 748, user-supplied ratings 720 of the comments, and media 718 that is included in the comments. As an illustration, if an average comment that an author receives is several hundred characters long, highly rated, and includes pictures, an author's reputational score may be higher than if the average comment was a short "Happy Birthday!" that was poorly rated and did not include multi-media content.

Statistical data on links 728, that are included in comments that are received on posts by the author 748, may be analyzed to determine if the links are to spam documents (lowering an author's reputational score) or are associated with documents that are ranked highly by an internet search engine (increasing an author's reputational score). Statistics regarding a number of unique commenters 724, a number of responses to comments 722, and a frequency of commenting by each commenter 726 may be analyzed. For example, if a post by an author receives comments from many different commenters (instead of the same commenters repeatedly), receives numerous comments to comments, and the commenters are infrequent posters or commenters, a reputational score of the author may increase. In various examples, a reputational score of an author may increase more if comments on the author's posts are provided by highly-ranked authors than authors that are not highly ranked.

Numerous variations of the statistical information described herein may be analyzed to rank an author or rank a post associated with an author. For example, trend analysis may be performed on a signal to identify if the signal is trending upwards or downwards. Time-dependency analysis may be performed to identify a time of day, week, month or year that an author receives increased interaction by other users with his posts.

The second category of signals (e.g., scores of users that have agreed to subscribe to the author 716) is now discussed. In this illustration, four users—Bill 732, Frank 734, Lindsey 736, and Hal 738—have agreed to follow the author 748. The reputational score for author 748 may not only be based on interaction with the user's posts, but also may be determined based on a score of authors that follow author 748 (e.g., scores 42, 17, 29, and 182). The scores 42, 17, 29, and 182 are referenced by reference numbers 740, 742, 744, and 746 respectively. An understanding is that quality authors are more likely to subscribe to other quality authors, and that quality authors may be unlikely to subscribe to low quality authors or spammers. Thus, high reputational scores are passed onto high quality users. Author subscriptions may be considered a particularly relevant link to pass forward reputational scores because a user of the micro-blogging service may be forced to receive posts from subscribed authors. The user may be unable to flag an author as subscribed and forget about the author. Indeed, the subscribed author's posts may continue to pop up in the user's feed, thus regularly reminding the user to reevaluate his decision to subscribe to the author.

Also, if an author begins to submit low-quality posts, those subscribing users that are inattentive (e.g., because they use the micro-blogging service rather infrequently), are unlikely to be associated with high scores that may positively impact a score of the author if passed forward.

Numerous mechanisms are contemplated for weighting an author's reputational score based on reputational scores of subscribing users. As a simple example, 50% of a user's score may be determined based on any combination and weighting of signals 704-712 and a signal from the comment quality determination unit 714 (or signals that are fed to unit 714), the remaining 50% of the user's reputational score is determined based on the scores of following authors. The portion of the reputational score determined by subscribing author's scores may be an average reputational score of the subscribing authors, a mean reputational score of the subscribing authors, a sum of the reputational scores by the subscribing authors, etc.

In some implementations, an author's reputational score is passed forward to authors that the user comments on. For example, if a user with a high reputational score comments on another user's posts (but does not subscribe to that user's posts), the other user's reputational score can increase, even though the user with the high reputational score may not subscribe to the other user's posts.

Figure 8:
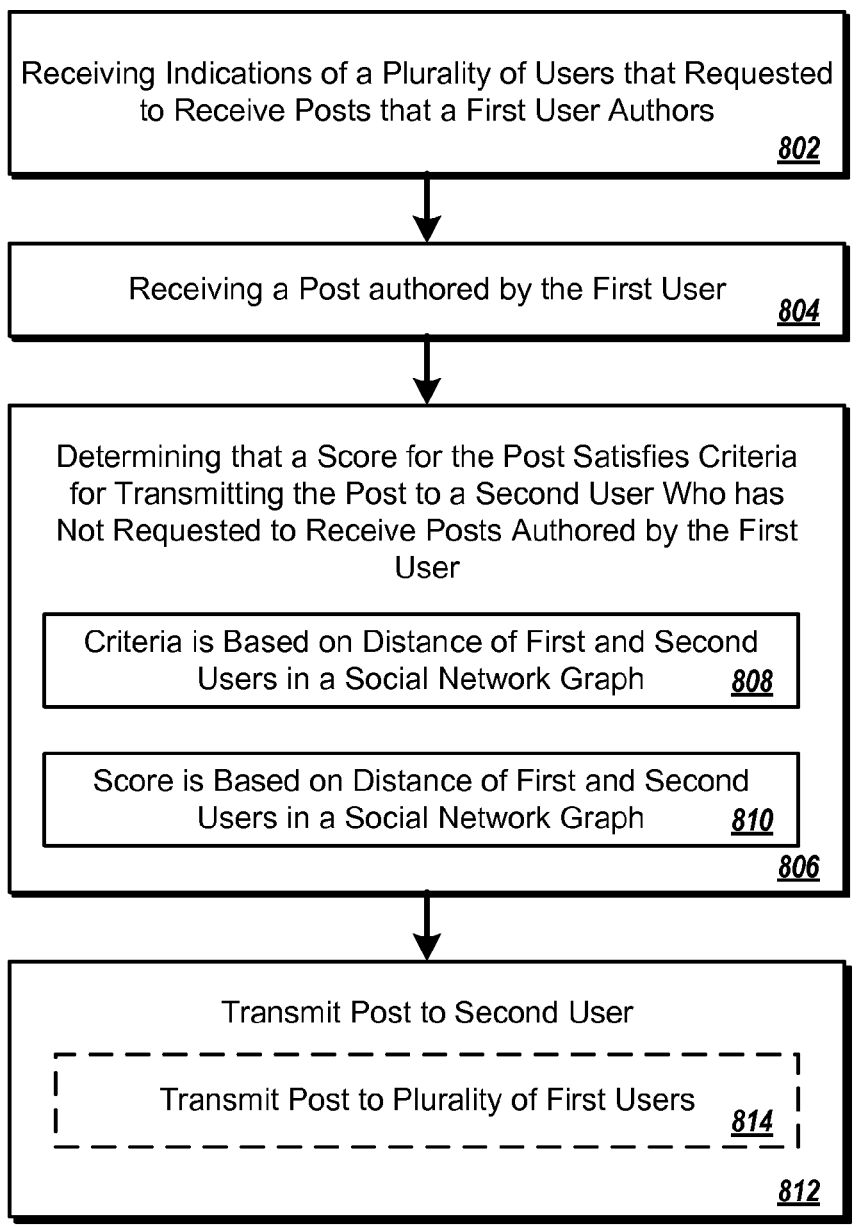
FIG. 8 is a flowchart of an example process for recommending posts to non-subscribing users.

FIG. 8 is a flowchart of an example process 800 for recommending posts to non-subscribing users. The process may be used in connection with systems 500 and 700, for example. In box 802, indications of a plurality of users that requested to receive posts authored by a first user authors are received. For example, over a period of time (e.g., several days or months) users of a micro-blogging messaging service may use various mechanisms to subscribe to a first user. For example, users may search a directory of users of the micro-blogging service and select the first user as an individual that each subscribing user would like to follow. In particular, the subscribing users may agree that all posts authored by the first user will be provided into a stream of posts displayed for each subscribing user. In response to each request to subscribe to the first user, an indication of the subscription request may be transmitted from a computing device to a server system that hosts the micro-blogging service. The server system may store in a repository (e.g., repository 546) a list of the received subscription indications. The stored subscription indications may be received by the server system from the repository upon a later request to perform a statistical analysis.

In box 804, a post authored by the first user is received. For example, the server system may receive, from a computing device, a post that includes textual content. The first user may have used a virtual keyboard on a touchscreen of an application telephone computing device to enter a textual post into an input box and select a "post" graphical interface element. The application telephone may have transmitted the textual post to the server system.

In box 806, a determination is made that a score for the post satisfies criteria for transmitting the post to a second user, where the second user is a user of the micro-blogging service that has not subscribed or otherwise requested to receive posts that are authored by the first user. For example, a score for the first post may be calculated and the score may be transmitted to the second user if the score exceeds a threshold value.

In box 808, the criteria is based on a distance of the first and second users in a social network graph. For example, the threshold that the score must exceed may be calculated based on a minimum number of acquaintance relationships that connect the first and second users or a distance between the first and second users. Example heuristics for determining a distance between two users are discussed in greater detail above, for example, in connection with FIGS. 5, 6A, and 6B.

In box 810, the post score is based on a distance of the first and second users in a social network graph. For example, a global score for the post may be modified to generate a personal score that is based on a distance between the first and second users. In other examples, the personal score is generated by weighting various statistics based on a social network distance between the second user and a source of the statistic (e.g., a distance between the second user and another user that commented on the first user's post).

In box 812, the post is transmitted to the second user. The transmission may be performed in response to determining that the score satisfies the criteria. For example, the server system that hosts the micro-blogging service may transmit the post that it received from the first user's computing device and distribute the post to a computing device that is associated with the second user (e.g., a computing device at which the second user logged into a user account that is unique to the second user and is for the micro-blogging service).

In box 814, the server system transmits the post to the plurality of first users (i.e., the users that subscribe to the first user).

Figure 9:
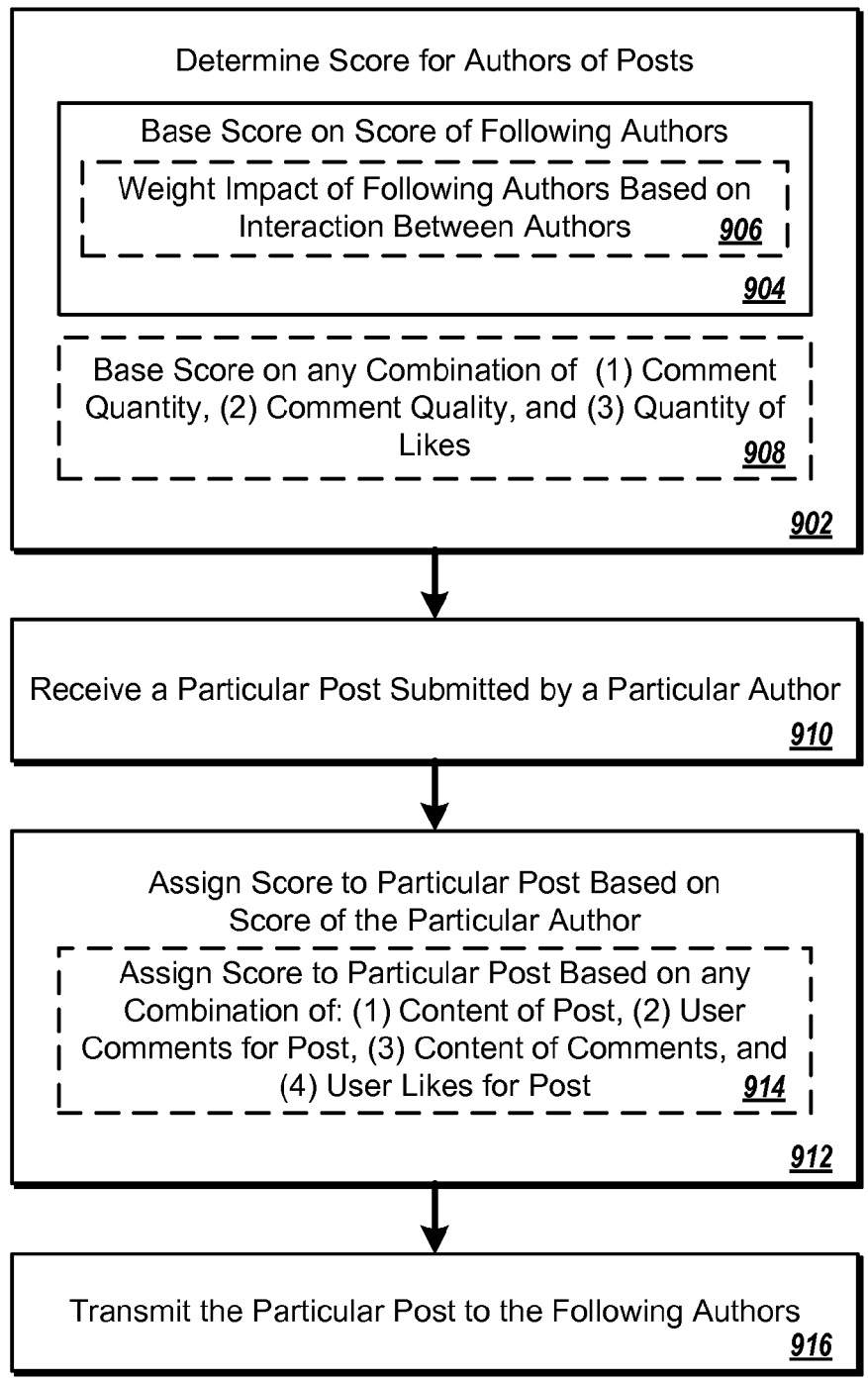
FIG. 9 is a flowchart of an example process for scoring authors of posts.

FIG. 9 is a flowchart of an example process 900 for scoring authors of posts. The process may be used in connection with systems 500 and 700, for example. In box 902, a score for post authors is determined. The score may be determined based upon two collections of statistical information, a score of users that follow each post author (box 904), and interaction by other users with the author's posts (box 906). In box 904, a score for an author is determined based on a score of users that have agreed to follow the author. For example, if a following author is associated with a high author score, that high score may have a beneficial impact on the followed author. In some examples, an impact of a following author on a score of a followed author depends on an amount of interaction between the authors (box 906). For example, if a following author with a high score follows two authors, and communicates with one of the authors more than the other, the followed author that receives frequent communications from the following author can receive a greater boost in his own score than the other author.

In box 908, an author's score is based on a combination of (i) a quantity of comments that the author's posts receive, (ii) a quality of comments that the author's posts receive, and (iii) a quantity of "likes" that the author's posts receive. For example, an author's score may increase if his posts over the last two months have received an average amount of comments that is greater than an average of all users. An author's score may increase if his posts, since he opened his account, have received comments that have a longer average length than an average comment length of all users. An author's score may increase if his posts have received a quantity of "likes" from unique users that is greater than an average quantity of likes from unique users that are received on posts by users of the messaging system.

In box 910, a particular post submitted by a particular author is received. For example, a server system that is hosting the micro-blogging service may receive a post from a user of the micro-blogging service.

In box 912, a score is assigned to the particular post based on the score of the particular author. Additionally, the score for the particular post can be weighted based on any combination of: (i) content of the post, (ii) user comments for the post, (iii) content of the comments, and (iv) user likes for the post (box 914). As an illustration, 60% of the score for a post may be determined based on the combination of (i), (ii), (iii), and (iv), while the remaining 40% of the post's score may be based on a reputational score of the author of the post. Various mechanisms are contemplated for weighting the described factors and assigning the score to the post.

In box 916, the particular post is transmitted to the following authors. For example, the post may be transmitted from the server system to computing devices associated with each of the following users (e.g., computing devices that the following users log into). In some examples, the post is only transmitted if the post score exceeds a predetermined threshold. In some examples, the post score is transmitted with the post so that the computing device may rank the posts in an order based on their scores or allow the user to filter out low scoring posts.

Figure 10:
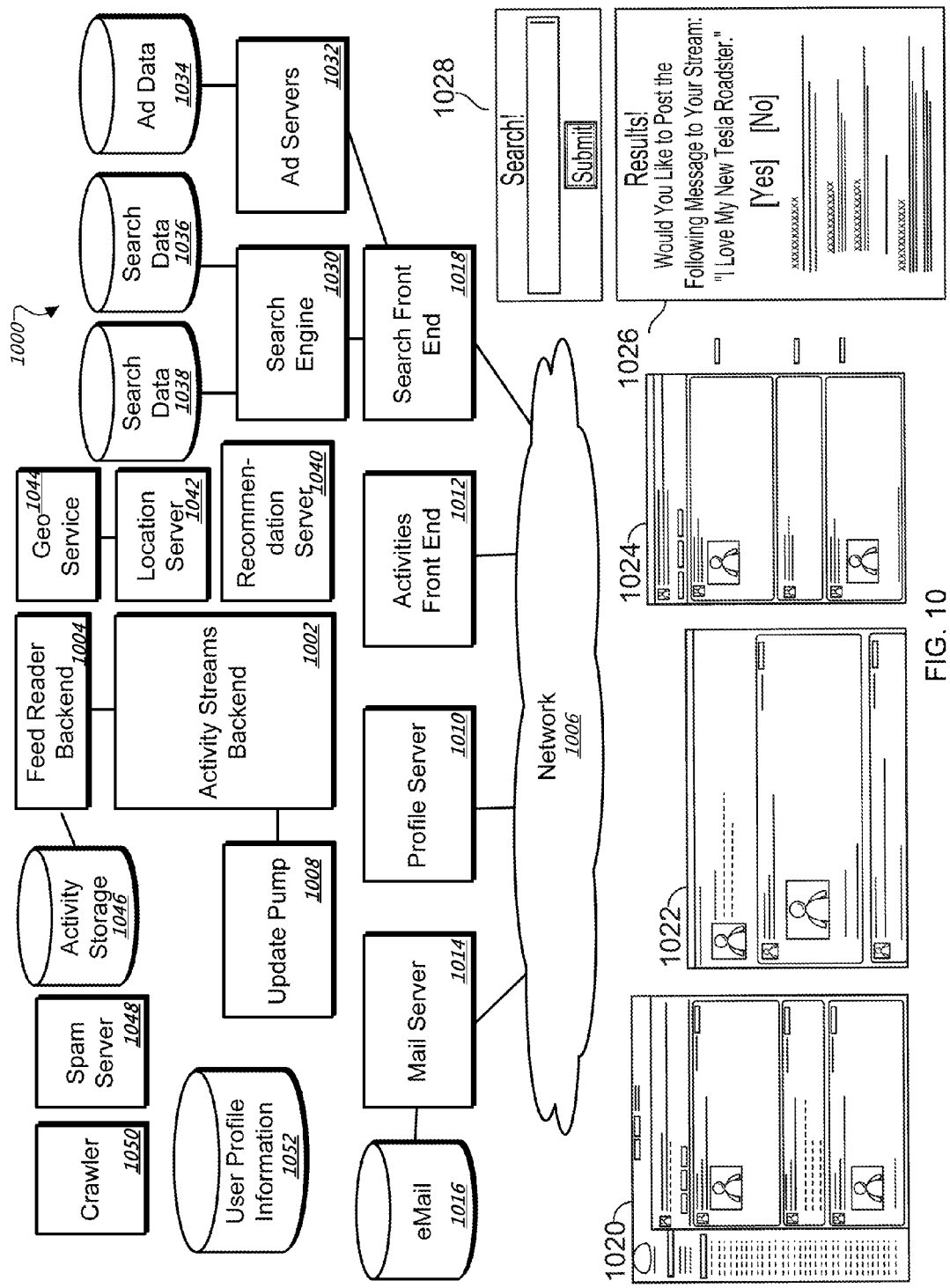
FIG. 10 is a schematic diagram of a system within which the various features described in this document may be implemented.

FIG. 10 is a schematic diagram of a system 1000 within which the various features described in this document may be implemented. In general, the system 1000 permits various users to post, review, and comment on various activity streams of information, within a social networking framework. For example, a user may make a micro-blogging post about a recent happening in the user's life or about a news article the user recently read. That post may be forwarded to other users who have chosen to follow the first user (who may be an individual or an organization). Those other users may see the post using a stream reader, or the post may be displayed in their email applications (e.g. either in line with their regular email messages or under a separate tab). Those users may choose to comment on the post, and other users may also comment on the post or comment on the comments of other users. Such comments may be included and shown in the various users email application even if they were made after the post was originally connected to the email application. Thus, the various types of feedback may be made available to each user conveniently in one place. Users may also see posts related to other users my visiting profile pages for those other users, and may also go to their own profile pages or to their stream pages to see all of the posts and comments for posts to which they are subscribed.

The various posts, and comments on posts, are managed in the system 1000 by an activity streams backend 1002, which is in charge of implementing business logic that defines the manner in which various submissions to the system 1000 will be handled. The activity streams are characterized by activities, which are the subjects of posts (e.g., micro-blog posts) that users submit to the system 1000, and various comments directed toward those activities. For example, a user may post an activity regarding a web page they are currently viewing by pasting a URL of the page into a posting page. Such action may cause the system 1000 to gather important information from the URL, including images displayed on the page, headings, labels for images, or topical terms that describe a topic of the page (e.g., as previously determined by analysis of the words on the page, such as using ADSENSE analysis of the page). The system 1000 may also obtain location information, such as the current location of the user, and/or a venue with which the user is most currently associated (e.g., that the user checked into recently or identified as a venue in which the user is located).

The activity streams back-end 1002 also implements logic for determining what users are to receive posts, comments on posts, and other portions of streams in the system 1000. In particular, users who have subscribed to receive posts form other users may be provided with posts when they log into the system 1000, users may nominate other users to receive copies of streams when those other users would not ordinarily be included in the streams (e.g., by typing in identifiers for those other users when reviewing a post), and users may send streams directly to each other, among other things.

The feed reader back end 1004 manages storage of posts and related data for the system 1000. The feed reader back end 1004 may rely on various levels of activity storage 1046 to store posts, comments, on posts, and other information needed to construct streams for users when they request information from system 1000. As with the other components shown in this figure, the feed reader back end 1004, though shown as a single block, can be implemented using a number of different servers or server sub-systems Likewise, the activity storage 1046 can be implemented across a number of databases and database types, and across a variety of servers and server sub-systems.

When posts or other updates are received by the activity stream back-end 1002, they are formatted and provided to update pump 1008. The update pump 1008 is responsible for provided notices about newly-posted information to various services that may need such information. It acts, in effect, as a router and distributor of information relating to the system 1000. For example, a mail server 1014 may include functionality for integrating the display of streams, and may thus need to know about new posts so that users of a mail client can be shown immediately when new information is posted. In a similar manner, a search engine 1030 may provide search results to users that include real-time updating information from various posts that users are supplying to the system, and can receive such updated information by interacting with the update pump 1008 via understood APIs and remote procedure calls (RPCs) where the two components are sub-components of a larger organization-wide system.

Various web front-ends are provided to permit the system 1000 communicate over a network 1006, such as the internet (and adjacent supporting networks). For example, the mail server 1014 may provide typical web-based electronic mail functionality, though with the integration of posts and comments into users' in boxes, via a mail client 1020. For example, streams may show up as discrete messages in user's in box, and may be updated in real time to include the latest comments on the streams and originating posts for the streams. Such content may be active, in that a user may be allowed to interact with it substantially to a level that they could if they were reviewing the streams in a dedicated stream reader. For example, selectable controls may be provided with a stream that is displayed by the email client 1020, and a user may choose one in order to post a comment to be added to a stream, without having to leave the context of the message within the email client 1020.

A profile server 1010 generates code for representing user profiles such as profile 1022 of user Joe Blow. The profile page may take the form of a standard feed page from a social networking site, arranged with a list of posts and comments from other users in reverse chronological order. In a similar manner, an activities front end 1012 can generate a similar feed for a user's feed page 1024, here for a user named Susie User. The profile page 1022 and the feed page 1024 may be very similar to each other, and can present content similar to that presented as part of a posting or micro-blogging section of mail client 1020. In one example, the profile page 1022 is what third parties see when they look at the user's account, while the feed page 1024 is what the user himself or herself sees.

A search engine 1030 and associated search front end 1018 may provide a different sort of functionality for the system 1000. Specifically, the search front end 1018 may allow users to provide posts or comments from non-traditional sources, such as search boxes, e.g., on a search web page or in a search box on a toolbar installed on their machines an operating in concert with their web browsers. Such posts or comments may be submitted by users and may be received by the search front end in a standard manner, just as search requests are. The intent of a user to submit a post rather than a search query (or in addition to a search query) may be determined by syntactical analysis of the submission. In one example, if a query is preceded by the letter "z", with a space after it (see screen 1028)—a construct that is seldom submitted as a real search query—the system may parse the submission apart and assume, from the syntax, that the user intends to post the remainder of the submitted query as a post to their social network.

Such a post may be made immediately or after confirming with the submitting user that they would like to make a posting. For example, a search results page 1026 may be generated that contains actual search results for the submitted query (whether with or without the preceding "z") generated by the search engine 1030 using data from index 1038 in a conventional manner, and may be displayed below an area that shows the user the form of a proposed post and selectable controls by which the user can edit the post and can then confirm an intent to post the information to friends, followers, or others. The post may then be forwarded by the search front end 1018 to the activity streams backend 1002, along with identifying information for the user (e.g., a user ID identified from a cookie on the user's computing device when the user is logged onto a broader service that implements the system 1000).

Other syntax submitted by a user may produce different results. For example, if a user enters an email address (e.g., of the form "name@domain.com"), the system may identify that syntax as indicating an intent to send the remaining text of the submission as an email message to the user at the provided email address. Likewise, if the user starts a submission with a control character followed by a communication mode identifier, the remainder of the submission may be submitted for posting in tat communication mode, either without or without first presenting the proposed action to the user and confirm that the user intends such a communication to occur. For example, if a user types "z blog I'm having a great time," the syntax may indicate to the system 1000 that the user would like to post the submitted phrase "I'm having a good time" to the user's blog (where the identity of the blog may be determined by the system 1000 using a user ID stored as a cookie on the user's computing device, and which can be correlated to an account for the user that is in turn correlated to the blog).

The search results and other information (e.g., posts and email messages) may be accompanied by targeted advertisements directed to the search query or other similar information, such as profile information, the text of posts or comments by a user, the text of posts or comments of users who have a relationship with a user (e.g., as friends, followers, or users that the first user follows). Such advertisements may be served, through the search front end 1018, or the other front ends 1010, 1012, 1014 to users of the system 1000 and may be targeted using techniques like those employed in GOOGLE ADWORDS OR ADSENSE. Such serving of advertisements may depend on ad data in database 1034, which may include information about advertisers, the text and other content for the advertisements, bid prices submitted by the various advertisers, and other relevant information needed to serves advertisements that are directed to users and/or streams of information directed from or to the users.

Various location-based services may be integrated with posts or comments, such as by identifying the locations (e.g., lat/long coordinates) or venues (e.g., stores, arenas, bars, or restaurants) from which posts or comments are made. Such services are provided in this example system 1000 by a location server 1042 and geo service 1044. The location server 1042 generally provides information about venues or other landmarks in response to receiving location information about a user of system 1000. For example, when a user submits a post, geo-coordinates for the user may be provided with the post (e.g., via GPS functionality on the user's mobile computing device) or may be determined for the user by the system 1000 (e.g., via cell tower or access point identification or triangulation). The geo-location information may be an estimated latitude and longitude of the mobile computing device and information identifying an accuracy of the estimation. The location server 1042 may be made available through an API to various other components of the system 1000.

The location server 1042 may use such geo-location information to identify one or more venues (e.g., stores, restaurants, or bars) in the general location of the user, may use proximity of the user to each venue and other signals (e.g., popularity of each venue as determined from search queries submitted with the venue name, check-ins at the venue by users of the system 1000, a volume of activity associated with posts from the venue, a reputation of a post's author, for example, through number of subscribers, a volume of comments on posts, or a similarly determined reputation of the subscribers) to provide a ranked list of venues in the geographic area that the user may be in. The user may be presented with a single suggestion for a venue or several suggested venues. The user may then select one such venue, and that venue may be associated with the post when other users review it. For example, the post may be accompanied by meta data indicating that the post was "Posted from Dive Bar," and other users may select the name "Dive Bar" to see additional information about the venue, including other posts from the venue, ratings of the venue, streams that belong to the venue (e.g., if a manager of the venue has made the venue a user of the system 1000) and other similar information.

The location server 1042 may obtain information that it needs to provide such functionality from various external services, such as geo service 1044. Geo service 1044 may be a service that communicates via standard APIs to receive location information (e.g., lat/long coordinates) and to provide more advanced information in response. The more advanced information may include a street address that is determined to be associated with the lat/long coordinates (e.g., a street address that is nearest to a particular location represented by the lat/long coordinates). The more advance information may also include a list of venue names that are geographically near the particular location, street addresses for the venues, descriptive information for the venues, map tiles that are associated with the particular location, and a relevance score for each venue. The relevance score for each venue may identify how relevant the particular venue is based on any combination of (i) the received location information, (ii) an accuracy of the received location information, and (iii) a distance between the venue and a location identified by the received location information.

Other components may interact with the components already described to provide additional functionality foe the system 1000. For example, a crawler 1050 may crawl various posts and comments for the purpose of indexing the content in the system 1000, so that, for example, search engine 1030 may readily deliver search results that include the latest postings by users to the system 1000. Also, spam server 1048 may communicate with the activity streams backend 1002 and/or the update pump 1008 to identify posts or comments that may be inappropriate (e.g., offensive, abusive, or otherwise inappropriate), duplicative, deceptive (e.g., in which one user poses as another user), and to act appropriately with respect to such content (e.g., providing for automatic and/or manual review of the content and perhaps removing the content from the system 1000 or making the content hidden).

Finally, a recommendation server 1040 may be provided with any new activity or post that is submitted to the system 1000 (e.g., via the activity streams back-end 1002). The recommendation server 1040 may write back to the activity streams backend 1002 about the number of people who should receive the activity. Such information may be saved so that the next time a message is sent out about the activity (e.g., a comment on the activity), the new recommended users also get the activity. A quality score can be computed when determining what users should receive an activity, and the score can be determined by factors such as the distance of relationship between a user and other users who have posted to or recommended an activity, interests of a user as identified in the user's profile (e.g., the user is a member of a classic cars group in a social network, and thus is more likely to receive notices about activities relating to classic cars), or interests as identified by posts or other submissions that the user makes, users or activities that the user follows, and the like. A quality threshold may be set by the recommendation server 1040 in order to maintain an adequate level of recommendations (not too many and not too few).

Using the components described here, then, the system 1000 may provided for integration of various modes of posting and receiving content that is provided in streams, such as micro-blog posts and comments on such posts. Users may post in various ways, including directly into search boxes on search pages or toolbars, so that such users may be more tightly integrated into systems provided by the providers of the pages or toolbars, and may provide posts in contexts with which they are already very familiar. Also, the users may review posts and other content in their email client, also in a manner that is already familiar to them and does not require them to leave a familiar application in order to review such posts. Moreover, the content may be rich for the users, such that it may include information about locations and venues at those locations (from which a reader of the content may obtain additional information, such as from hyperlinks provided in posts), and the users may respond to posts in-line, such as from their email applications. In all these, ways the system 1000 may provide a communication facility that allows a user simpler and more complete interaction with friends and with other users, and may increase the level of knowledge that is made available to the users of the system 1000.

Figure 11:
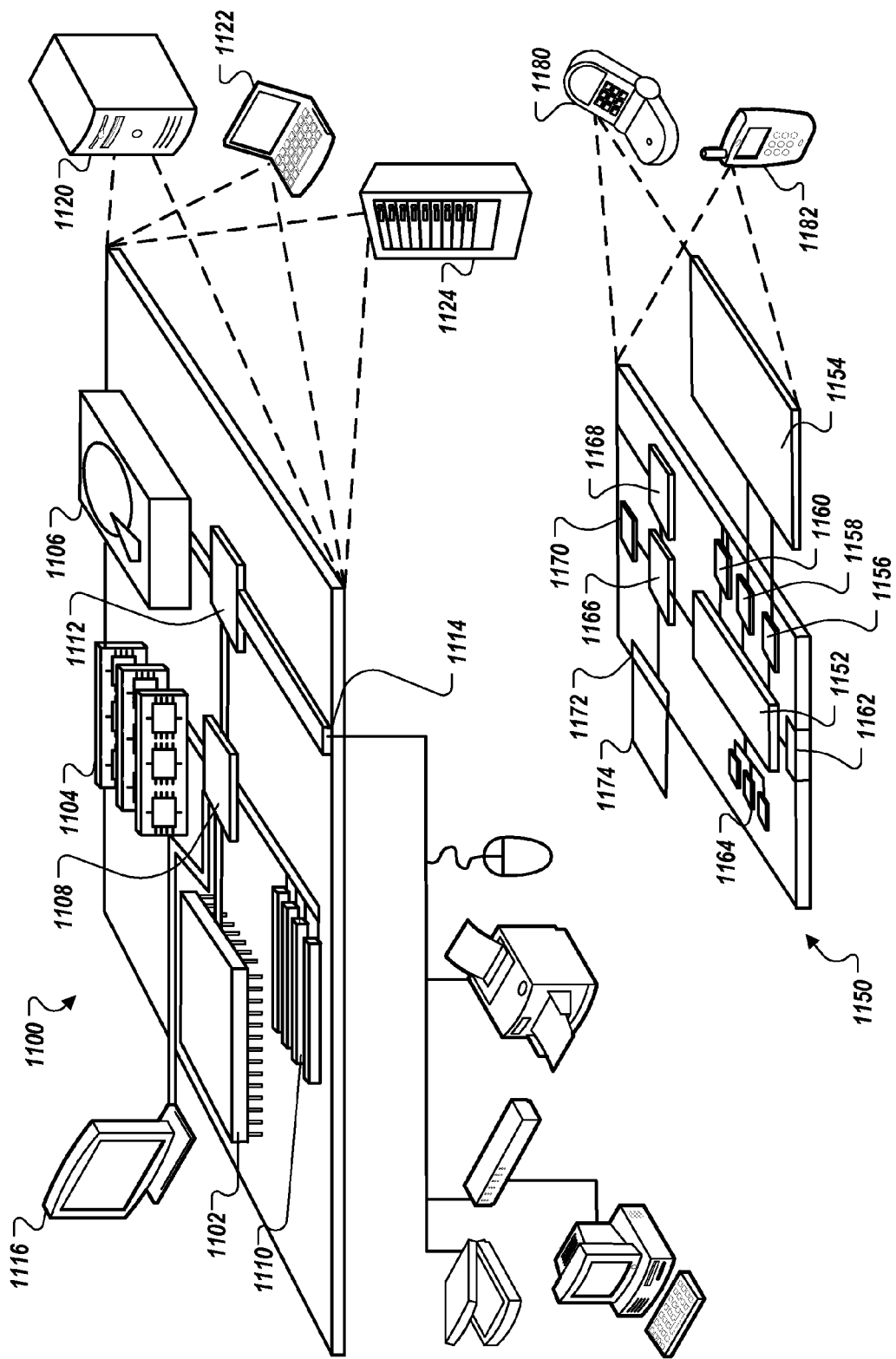
FIG. 11 is a block diagram of computing devices that may be used to implement the systems and methods described in this document, as either a client or as a server or plurality of servers.

FIG. 11 is a block diagram of computing devices 1100, 1150 that may be used to implement the systems and methods described in this document, as either a client or as a server or plurality of servers. Computing device 1100 is intended to represent various forms of digital computers, such as laptops, desktops, workstations, personal digital assistants, servers, blade servers, mainframes, and other appropriate computers. Computing device 1150 is intended to represent various forms of mobile devices, such as personal digital assistants, cellular telephones, smartphones, and other similar computing devices. Additionally computing device 1100 or 1150 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 1106. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high speed interface 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk.

The storage device 1106 is capable of providing mass storage for the computing device 1100. In one implementation, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1104, the storage device 1106, or memory on processor 1102.

The high speed controller 1108 manages bandwidth-intensive operations for the computing device 1100, while the low speed controller 1112 manages lower bandwidth-intensive operations. Such allocation of functions is exemplary only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The device 1150 may also be provided with a storage device, such as a microdrive or other device, to provide additional storage. Each of the components 1150, 1152, 1164, 1154, 1166, and 1168, are interconnected using various buses, and several of the components may be mounted on a common motherboard or in other manners as appropriate.

The processor 1152 can execute instructions within the computing device 1150, including instructions stored in the memory 1164. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT (Thin-Film-Transistor Liquid Crystal Display) display or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may be provide in communication with processor 1152, so as to enable near area communication of device 1150 with other devices. External interface 1162 may provide, for example, for wired communication in some implementations, or for wireless communication in other implementations, and multiple interfaces may also be used.

The memory 1164 stores information within the computing device 1150. The memory 1164 can be implemented as one or more of a computer-readable medium or media, a volatile memory unit or units, or a non-volatile memory unit or units. Expansion memory 1174 may also be provided and connected to device 1150 through expansion interface 1172, which may include, for example, a SIMM (Single In Line Memory Module) card interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provide as a security module for device 1150, and may be programmed with instructions that permit secure use of device 1150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, or memory on processor 1152 that may be received, for example, over transceiver 1168 or external interface 1162.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using a Bluetooth, WiFi, or other such transceiver (not shown). In addition, GPS (Global Positioning System) receiver module 1170 may provide additional navigation- and location-related wireless data to device 1150, which may be used as appropriate by applications running on device 1150.

Device 1150 may also communicate audibly using audio codec 1160, which may receive spoken information from a user and convert it to usable digital information. Audio codec 1160 may likewise generate audible sound for a user, such as through a speaker, e.g., in a handset of device 1150. Such sound may include sound from voice telephone calls, may include recorded sound (e.g., voice messages, music files, etc.) and may also include sound generated by applications operating on device 1150.

The computing device 1150 may be implemented in a number of different forms, as shown in the figure. For example, it may be implemented as a cellular telephone 1180. It may also be implemented as part of a smartphone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for recommending posts in a messaging service to users that do not subscribe to an author of the post and scoring authors of posts may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, the method comprising:
   identifying, by a computing system, multiple authors that have submitted posts to a messaging system, the multiple authors including at least a first author, a second author, and a third author;
   determining, by the computing system, a score for the first author based on a quantity of interactions, by a first group of at least some of the multiple authors, with posts that the first author has submitted to the messaging system;
   determining, by the computing system, a score for the second author based on a quantity of interactions, by a second group of at least some of the multiple authors, with posts that the second author has submitted to the messaging system;
   determining, by the computing system, a score for the third author based on the score for the first author and the score for the second author, due to the first author and the second author having requested to subscribe to a stream of posts that the third author submits to the messaging system;
   receiving, at the messaging system and from a computing device, a particular post that the third author submitted to the messaging system;
   assigning a score to the particular post based on the score for the third author;
   transmitting the particular post for receipt by computing devices that are associated with authors who have requested to subscribe to the stream of posts that the third author submits to the messaging system;
   determining that the score for the particular post satisfies a criteria for transmission to a recipient author that has not requested to subscribe to the stream of posts that the third author submits to the messaging system; and
   providing the particular post for display to the recipient author.

2. The computer-implemented method of claim 1, wherein:
   the score for the first author is further based on a quantity of authors that have requested to subscribe to a stream of posts that the first author submits to the messaging system, and
   the score for the second author is further based on a quantity of authors that have requested to subscribe to a stream of posts that the second author submits to the messaging system.

3. The computer-implemented method of claim 1, wherein:
   the quantity of interactions, by the first group of authors, with the posts that the first author has submitted to the messaging system includes a quantity of comments that have been received as replies to the posts that the first author has submitted to the messaging system, and
   the quantity of interactions, by the second group of authors, with the posts that the second author has submitted to the messaging system includes a quantity of comments that have been received as replies to the posts that the second author has submitted to the messaging system.

4. The computer-implemented method of claim 3, wherein:
   the score for the first author is further based on a quality of the comments that have been received as replies to the posts that the first author has submitted to the messaging system,
   the score for the second author is further based on a quality of the comments that have been received as replies to the posts that the second author has submitted to the messaging system, and
   wherein a quality of each comment is determined based on a substantive nature of text in the comment.

5. The computer-implemented method of claim 1, wherein:
   the quantity of interactions, by the first group of authors, with the posts that the first author has submitted to the messaging system includes a quantity of selections of an interface element that accompanies a display of the posts that the first author has submitted to the messaging system, and that when selected indicates favorable opinion of a post,
   the quantity of interactions, by the second group of authors, with posts that the second author has submitted to the messaging system includes a quantity of selections, of an interface element that accompanies a display of the posts that the second author has submitted to the messaging system, and that when selected indicates favorable opinion of a post.

6. The computer-implemented method of claim 1, wherein the first author has requested to subscribe to a stream of posts that are submitted by another author who is connected in a chain of one or more subscribing authors back to the third author.

7. The computer-implemented method of claim 1, further comprising ranking the particular post and other posts that are to be provided for display to an author of the multiple authors based on scores of the particular post and the other posts.

8. The computer-implemented method of claim 7, further comprising providing the particular post and the other posts for display in a ranked order by a display of a computing device.

9. The computer-implemented method of claim 1, wherein determining the score for the third author based on the score for the first author and the score for the second author includes weighting an impact of the score for the first author and the score for the second author based on a level of interaction between the first author and the third author, and the second author and the third author, respectively.

10. The computer-implemented method of claim 1, wherein the score for the third author is based on an aggregation of the score for the first author and the score for the second author.

11. The computer-implemented method of claim 1, wherein determining the score for the first author is further based on the score for the third author, due to the third author having requested to subscribe to a stream of posts that the first author submits to the messaging system.

12. One or more non-transitory computer-readable medium storing instructions that, when executed by one or more processors, cause performance of operations that comprise:
   identifying, by a computing system, multiple authors that have submitted posts to a messaging system, the multiple authors including at least a first author, a second author, and a third author;
   determining, by the computing system, a score for the first author based on a quantity of interactions, by a first group of at least some of the multiple authors, with posts that the first author has submitted to the messaging system;
   determining, by the computing system, a score for the second author based on a quantity of interactions, by a second group of at least some of the multiple authors, with posts that the second author has submitted to the messaging system;
   determining, by the computing system, a score for the third author based on the score for the first author and the score for the second author, due to the first author and the second author having requested to subscribe to a stream of posts that the third author submits to the messaging system;
   receiving, at the messaging system and from a computing device, a particular post that the third author submitted to the messaging system;
   assigning a score to the particular post based on the score for the third author; transmitting the particular post for receipt by computing devices that are associated with authors who have requested to subscribe to the stream of posts that the third author submits to the messaging system;
   determining that the score for the particular post satisfies a criteria for transmission to a recipient author that has not requested to subscribe to the stream of posts that the third author submits to the messaging system; and
   providing the particular post for display to the recipient author.

13. The one or more non-transitory computer-readable medium of claim 12, wherein:
   the score for the first author is further based on a quantity of authors that have requested to subscribe to a stream of posts that the first author submits to the messaging system, and
   the score for the second author is further based on a quantity of authors that have requested to subscribe to a stream of posts that the second author submits to the messaging system.

14. The one or more non-transitory computer-readable medium of claim 12, wherein:
   the quantity of interactions, by the first group of authors, with the posts that the first author has submitted to the messaging system includes a quantity of comments that have been received as replies to the posts that the first author has submitted to the messaging system, and
   the quantity of interactions, by the second group of authors, with the posts that the second author has submitted to the messaging system includes a quantity of comments that have been received as replies to the posts that the second author has submitted to the messaging system.

15. The one or more non-transitory computer-readable medium of claim 14, wherein:
   the score for the first author is further based on a quality of the comments that have been received as replies to the posts that the first author has submitted to the messaging system,
   the score for the second author is further based on a quality of the comments that have been received as replies to the posts that the second author has submitted to the messaging system, and
   a quality of each comment is determined based on a substantive nature of text in the comment.

16. The one or more non-transitory computer-readable medium of claim 12, wherein:
   the quantity of interactions, by the first group of authors, with the posts that the first author has submitted to the messaging system includes a quantity of selections of an interface element that accompanies a display of the posts that the first author has submitted to the messaging system, and that when selected indicates favorable opinion of a post, and
   the quantity of interactions, by the second group of authors, with posts that the second author has submitted to the messaging system includes a quantity of selections, of an interface element that accompanies a display of the posts that the second author has submitted to the messaging system, and that when selected indicates favorable opinion of a post.

17. The one or more non-transitory computer-readable medium of claim 12, wherein the first author has requested to subscribe to a stream of posts that are submitted by another author who is connected in a chain of one or more subscribing authors back to the third author.

18. The one or more non-transitory computer-readable medium of claim 12, wherein the operations further comprise ranking the particular post and other posts that are to be provided for display to an author of the multiple authors based on scores of the particular post and the other posts.

19. The one or more non-transitory computer-readable medium of claim 18, wherein the operations further comprise providing the particular post and the other posts for display in a ranked order by a display of a computing device.

20. The one or more non-transitory computer-readable medium of claim 12, wherein determining the score for the third author based on the score for the first author and the score for the second author includes weighting an impact of the score for the first author and the score for the second author based on a level of interaction between the first author and the third author, and the second author and the third author, respectively.

21. The one or more non-transitory computer-readable medium of claim 12, wherein the score for the third author is based on an aggregation of the score for the first author and the score for the second author.

22. The one or more non-transitory computer-readable medium of claim 12, wherein determining the score for the first author is further based on the score for the third author, due to the third author having requested to subscribe to a stream of posts that the first author submits to the messaging system.

23. A computing system comprising
one or more computer processors and
memory accessible to the one or more computer processors and storing instructions that, when executed by the one or more computer processors, cause performance of operations that comprise:
identifying, by the computing system, multiple authors that have submitted posts to a messaging system, the multiple authors including at least a first author, a second author, and a third author;
determining, by the computing system, a score for the first author based on a quantity of interactions, by a first group of at least some of the multiple authors, with posts that the first author has submitted to the messaging system;
determining, by the computing system, a score for the second author based on a quantity of interactions, by a second group of at least some of the multiple authors, with posts that the second author has submitted to the messaging system;
determining, by the computing system, a score for the third author based on the score for the first author and the score for the second author, due to the first author and the second author having requested to subscribe to a stream of posts that the third author submits to the messaging system;
receiving, at the messaging system and from a computing device, a particular post that the third author submitted to the messaging system;
assigning a score to the particular post based on the score for the third author; transmitting the particular post for receipt by computing devices that are associated with authors who have requested to subscribe to the stream of posts that the third author submits to the messaging system;
determining that the score for the particular post satisfies a criteria for transmission to a recipient author that has not requested to subscribe to the stream of posts that the third author submits to the messaging system; and
providing the particular post for display to the recipient author.

24. The computing system of claim 23, wherein:
the score for the first author is further based on a quantity of authors that have requested to subscribe to a stream of posts that the first author submits to the messaging system, and
the score for the second author is further based on a quantity of authors that have requested to subscribe to a stream of posts that the second author submits to the messaging system.

25. The computing system of claim 23, wherein:
the quantity of interactions, by the first group of authors, with the posts that the first author has submitted to the messaging system includes a quantity of comments that have been received as replies to the posts that the first author has submitted to the messaging system, and
the quantity of interactions, by the second group of authors, with the posts that the second author has submitted to the messaging system includes a quantity of comments that have been received as replies to the posts that the second author has submitted to the messaging system.

26. The computing system of claim 25, wherein:
the score for the first author is further based on a quality of the comments that have been received as replies to the posts that the first author has submitted to the messaging system,
the score for the second author is further based on a quality of the comments that have been received as replies to the posts that the second author has submitted to the messaging system, and
a quality of each comment is determined based on a substantive nature of text in the comment.

27. The computing system of claim 23, wherein:
the quantity of interactions, by the first group of authors, with the posts that the first author has submitted to the messaging system includes a quantity of selections of an interface element that accompanies a display of the posts that the first author has submitted to the messaging system, and that when selected indicates favorable opinion of a post, and
the quantity of interactions, by the second group of authors, with posts that the second author has submitted to the messaging system includes a quantity of selections, of an interface element that accompanies a display of the posts that the second author has submitted to the messaging system, and that when selected indicates favorable opinion of a post.

28. The computing system of claim 23, wherein the first author has requested to subscribe to a stream of posts that are submitted by another author who is connected in a chain of one or more subscribing authors back to the third author.

29. The computing system of claim 23, wherein the operations further comprise ranking the particular post and other posts that are to be provided for display to an author of the multiple authors based on scores of the particular post and the other posts.

30. The computing system of claim 29, wherein the operations further comprise providing the particular post and the other posts for display in a ranked order by a display of a computing device.

31. The computing system of claim 23, wherein determining the score for the third author based on the score for the first author and the score for the second author includes weighting an impact of the score for the first author and the score for the second author based on a level of interaction between the first author and the third author, and the second author and the third author, respectively.

32. The computing system of claim 23, wherein the score for the third author is based on an aggregation of the score for the first author and the score for the second author.

33. The computing system of claim 23, wherein determining the score for the first author is further based on the score for the third author, due to the third author having requested to subscribe to a stream of posts that the first author submits to the messaging system.

* * * * *

UNITED STATES PATENT AND TRADEMARK OFFICE
CERTIFICATE OF CORRECTION

PATENT NO. : 8,606,792 B1　　　　　　　　　　　　　　　　　　　　　　　Page 1 of 1
APPLICATION NO. : 12/756072
DATED : December 10, 2013
INVENTOR(S) : Jackson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 402 days.

Signed and Sealed this
Twenty-third Day of May, 2017

Michelle K. Lee
*Director of the United States Patent and Trademark Office*